United States Patent [19]

D'Alelio

[11] 4,197,397
[45] Apr. 8, 1980

[54] CHAIN-EXTENDING ANHYDRIDE END-CAPPED POLYIMIDES

[75] Inventor: Gaetano F. D'Alelio, South Bend, Ind.

[73] Assignee: University of Notre Dame du Lac, Notre Dame, Ind.

[21] Appl. No.: 883,894

[22] Filed: Mar. 6, 1978

Related U.S. Application Data

[60] Continuation of Ser. No. 558,449, Mar. 14, 1975, abandoned, which is a division of Ser. No. 363,801, May 25, 1973, Pat. No. 3,897,395.

[51] Int. Cl.$^2$ .............................................. C08G 73/10
[52] U.S. Cl. ...................................... 528/222; 528/20; 528/26; 528/27; 528/28; 528/125; 528/126; 528/108; 528/170; 528/172; 528/179; 528/188; 528/207; 528/208; 528/223; 528/229; 528/312; 528/317; 528/321; 528/322; 528/351; 528/352; 528/353

[58] Field of Search ............... 528/125, 126, 172, 170, 528/188, 207, 208, 179, 312, 317, 321, 322, 222, 223, 220, 229, 351, 352, 353, 20, 26, 27, 28, 168

[56] References Cited

U.S. PATENT DOCUMENTS

| | | | |
|---|---|---|---|
| 3,505,295 | 4/1970 | Grundsteidl et al. | 528/322 |
| 3,511,807 | 5/1970 | Lovejoy | 528/322 |
| 3,652,500 | 3/1972 | Peterson | 528/322 |
| 3,663,510 | 5/1972 | Peterson | 528/322 |
| 3,954,710 | 5/1976 | Bower et al. | 528/322 |

*Primary Examiner*—Lester L. Lee
*Attorney, Agent, or Firm*—Michael, Best & Friedrich

[57] ABSTRACT

Aromatic polyimides with anhydride end groups are chain-extended (molecular weight increased) by reacting them with aromatic diamines or diamine terminated imide oligomers. The reaction can either be at a temperature above the melting point of the reactants or in solvents for the reactants. These polyimides can be shaped and formed prior to chain-extending.

17 Claims, No Drawings

CHAIN-EXTENDING ANHYDRIDE END-CAPPED POLYIMIDES

RELATIONSHIP TO OTHER APPLICATIONS

This application is a continuation of application Ser. No. 558,449, filed Mar. 14, 1975 and now abandoned, which in turn is a divisional of copending application Ser. No. 363,801, filed May 25, 1973 and now U.S. Pat. No. 3,897,395 issued July 29, 1975.

BACKGROUND OF THE INVENTION

1. Field of Invention

This invention relates to processes for preparing polymeric materials and polymeric materials so prepared and more particularly to processes for converting low molecular weight polyimides, with minimum elimination of by-products, to high molecular weight, thermally-stable polymers.

2. Prior Art

The synthesis in recent years of a number of thermally-stable polymers (e.g. polyimides) has supplied materials whose properties allow them to meet some critical end-use requirements. Their application to other uses is limited by a number of their specific properties, among which is intractability. This necessitates their use in dilute solutions in such exotic solvents as sulfuric acid, for example, to be spun into fibers. This excludes their use in laminations and in moldings. In addition, once isolated from the solvent, high temperatures are required to convert them to the fully condensed or cured final state. This curing is accompanied by the elimination of volatile by-products.

In contrast, polymers containing oxirane structures, such as epoxy-phenolics, can be cured at reasonably low temperatures with a minimum of by-products. However, the thermal stabilities of the oxirane polymers fall below those, for example, of the stable polybenzimidazoles. Thus, it is desirable to prepare oligomers which will propagate to higher molecular weights with minimum volatile elimination at relatively low temperatures and which will possess thermal stabilities reasonably higher than epoxy phenolics, preferably approaching the stabilities demonstrated by the polyimides and similar polyheterocyclics.

SUMMARY OF THE INVENTION

According to the present invention there is provided a polymeric chain-extending process comprising reacting a polyimide of the formula:

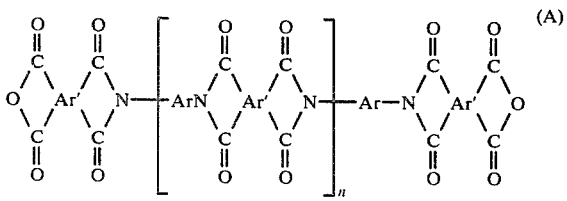

(A)

wherein
Ar' is a tetravalent aromatic organic radical, the four carbonyl groups being attached directly to separate carbon atoms and each pair of carbonyl groups being attached to adjacent carbon atoms in the Ar' radical,
Ar is a divalent aromatic organic radical, and
n is a positive integer of at least 2,
with an aromatic diamine of the formula $NH_2Ar\text{-}NH_2$ wherein Ar is as defined above or a diamine terminated imide oligomer of the formula

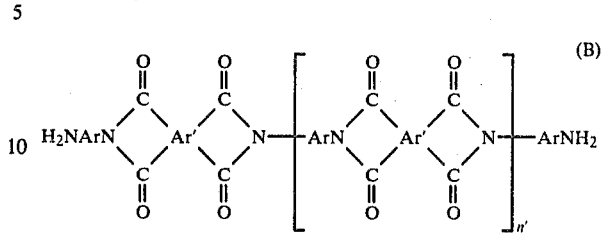

(B)

wherein
Ar' and Ar are as defined above, and
n' is zero or a positive integer of at least one.

There is also provided a cross-linked polymer prepared by the above-described process.

DETAILED DESCRIPTION OF THE INVENTION

The polyimides used in the process of the present invention are prepared by reacting an aromatic dianhydride, an aromatic diamine and, optionally, an organic monoamine to form oligomeric or higher molecular weight polyimides. The aromatic dianhydride has the general formula:

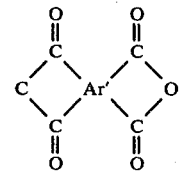

wherein Ar' is a tetravalent aromatic organic radical, preferably containing at least one ring of six carbon atoms, said ring characterized by benzenoid unsaturation, the four carbonyl groups being attached directly to separate carbon atoms and each pair of carbonyl groups being attached to adjacent carbon atoms in the Ar' radical. Any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis(2,3- dicarboxyphenyl)ethane dianhydride, 1,1-bis-(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, and benzene-1,2,3,4-tetracarboxylic acid dianhydride. The first three mentioned dianhydrides are preferred.

Aromatic diamines useful in preparing the starting polyimides and in the process have the general formula:

wherein Ar is a divalent aromatic organic radical. Preferred aromatic diamines are those wherein Ar is a divalent benzenoid radical selected from the group consisting of

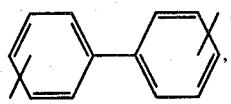

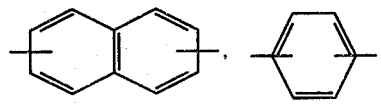

and multiples thereof connected to each other by $R^{IV}$, e.g.,

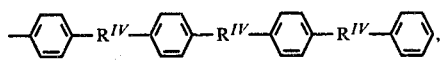

wherein $R^{IV}$ is an alkylene chain of 1-3 carbon atoms, —CH=CH—,

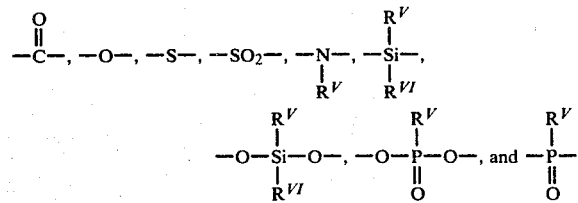

wherein $R^V$ and $R^{VI}$ are each selected from the group consisting of alkyl and aryl containing one to six carbon atoms, e.g., methyl, ethyl, hexyl, n-butyl, i-butyl and phenyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines.

The polyimide starting materials used in the process of the present invention are prepared according to the azeotroping process described in my copending application Ser. No. 363,800, filed May 25, 1973, the disclosure of which is hereby incorporated by reference. Briefly, the process involves reacting the dianhydride with the diamine in a phenol solvent of the formula

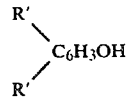

where each R' is hydrogen or a methyl radical in the presence of certain organic azeotroping agents, particularly cyclic hydrocarbons of 6 to 8 carbon atoms and most preferably benzene or toluene until most of the water of reaction is eliminated. A monoamine can also be used under certain conditions. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent.

The polyimide starting material prepared by the above-described process will have the formula:

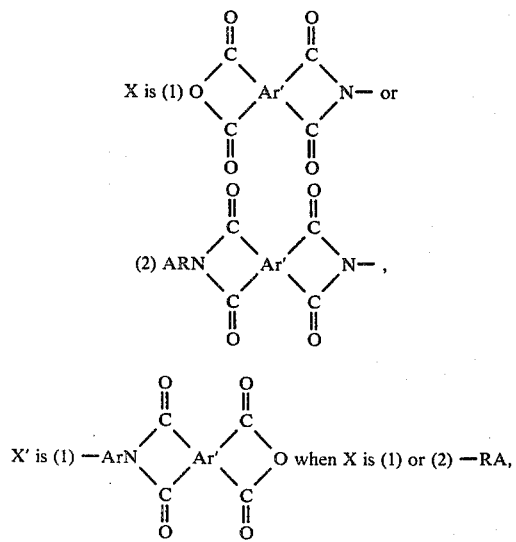

wherein Ar and Ar' are as defined previously,

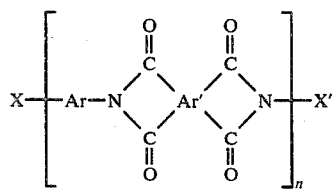

n is 0 when X and X' are (1) or is a positive integer of at least one, preferably at least 4 and usually in the range of 4 to 20, A is a terminal group which is —CH=CHR°, —C≡CR°, —CN, —CHO, —OH, —NH₂ or —CH=NR" wherein R" is a monovalent aromatic organic radical (phenyl, naphthyl, etc.), R is a hydrocarbon radical of 1 to 12 carbon atoms, and R° is H or R.

When the monoamine is not used in the azeotroping process, the polyimide starting material used in the present process will have two anhydride end groups when the molar ratio of dianhydride to diamine in the reaction mixture is m+1:m or two amine end groups when the molar ratio of dianhydride to diamine is m:m+1 where m is a positive integer of at least one and as high as n in the formula. Thus, the anhydride terminated polyimide will have the formula:

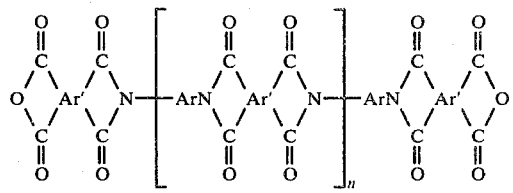

and the amine terminated polyimide can have the formula:

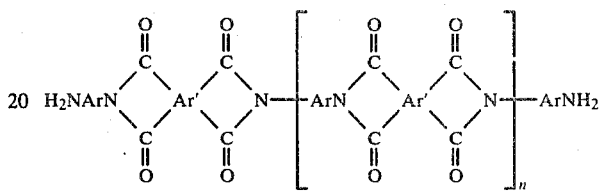

In this latter event R is also Ar.

When the molar ratio of dianhydride to diamine in the reaction mixture is m+1:m, two moles of a monoamine ARNH₂ can be added to the reaction mixture to provide the terminal groups (A), i.e., —CH=CHR°, —C≡CR°, —CN, —CHO, OH and —CH=NR" wherein R" is a monovalent aromatic radical. R is from 1 to 20 (preferably 1 to 10) carbon atoms. Examples of suitable amines are $H_2NCH_2CH=CH_2$, $H_2N(CH_2)_6CH=CH_2$, $H_2NC_6H_4CH=CH_2$, $H_2NCH_2C_6H_4CH=CH_2$, $H_2NC_6H_4CH_2CH=CH_2$, $H_2N(CH_2)_3C_6H_4CH=CH_2$, $H_2NC_6H_4C\equiv CH$, $H_2NCH_2C\equiv CH$, $H_2NCH_2CN$, $H_2NCH_2CH=CHCN$, $H_2NCH_2C\equiv CCN$, $H_2NC_6H_4CN$, $H_2NC_6H_4OH$, $H_2NC_6H_3(CH_3)CN$, $H_2NC_6H_4CH_2CN$, $H_2NC_6H_4CH_2OH$, $H_2NCH_2C_6H_4CN$, $H_2NCH_2C_6H_4OH$, $H_2NC_6H_4CH=CHCN$, $H_2NC_{10}H_7CN$, $H_2NC_{10}H_7OH$, $H_2NCH_2C_6H_4CH_2CN$, $H_2NCH_2C_6H_4CH_2OH$, $H_2NC_6H_4CHO$, $H_2NC_6H_4CH_2CHO$, $H_2NCH_2C_6H_4CH_2CHO$, $H_2NCH_2C_6H_4CHO$, $H_2NC_6H_4CH=CHCHO$, $H_2NC_6H_4CH=NC_6H_5$, $H_2NC_6H_4CH_2CH=NC_6H_4CH_3$. Preferred monoamines are allyl amine, styryl amine, propargyl amine, aminobenzyl cyanide and aminobenzyl nitrile.

The chain-extending process used to make high molecular weight polyimides will depend on the particular terminal groups present. For example, when the terminal groups are —CH=CHR°, —C≡CR°, —CN or —CH=NR", chain extension occurs by the self-coupling of the starting polyimide by heating, usually at a temperature in the range of about 150°–450° C.

In particular, when the terminal groups are —CH=CH₂ such as when either allyl amine or styryl amine is used as the monoamine, chain extension occurs as in vinyl polymerization by thermal or free radical initiation. In this situation, any of the free radical polymerization catalysts can be used, e.g., the peroxides such as benzoyl peroxide. A bis-maleimide can also be copolymerized with the —CH=CH₂ terminated polyimides. Bis-maleimides are known in the art and have the formula:

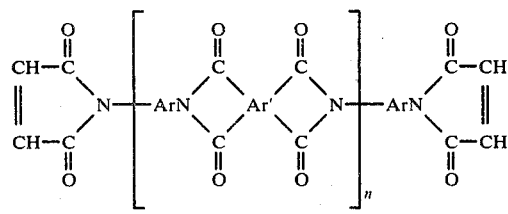

wherein

Ar and Ar' are as defined previously, and n is 0 or a positive integer of 1 to 20. These bis-maleimides can also be prepared by the azeotroping process of my aforesaid copending application Ser. No. 363,800. Other monovinyl or multivinyl monomers such as the acrylics, allyl methacrylate, ethylene dimethacrylate, styrene, maleic esters and the like can also be copolymerized.

When the terminal groups are —C≡CH, the polyimide can be chain-extended by catalytic polymerization in the presence of oxygen using a cuprous salt, e.g., cuprous chloride, cuprous sulfate, cuprous acetate, etc. Generally, about 0.1 to 5% by weight of the catalyst is sufficient.

Terminal groups which are —CN or —CH=NR'' are polymerized using a catalytic amount of a Lewis acid salt, i.e., about 0.15 to 5 weight percent of AlCl$_3$, SbCl$_3$, SbCl$_5$ or any others well-known as alkylation, isomerization or polymerization catalysts. For reasons of economy and handling, zinc chloride, zinc sulfate and the copper salts are preferred as the coupling catalysts.

Chain extension can also occur by coupling the starting polyimide with a complementary organic compound. The particular organic compound used will depend on the particular terminal groups. For example, when the terminal groups are —CH=CHR°, —C≡CR°, —CN, —CHO, or —CH=NR'', one mole of the polyimide can be reacted with at least ¾ mole (preferably 1–2 moles) of an aromatic bis-dipole of the formula Q—Ar—Q wherein Ar is a divalent aromatic radical (phenyl, naphthyl, etc.) and Q is

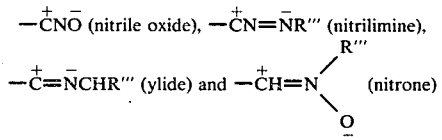

where R''' is an aliphatic or aromatic organic radical of 1 to 12 carbon atoms, preferably an aromatic radical (e.g., —C$_6$H$_5$, —C$_6$H$_4$(CH$_3$), etc.).

The chemistry of the monofunctional dipole compounds corresponding to the difunctional dipoles used in the present process is well known in the art. Syntheses of the monofunctional dipole compounds are exemplified by Rolf Huisgen, Agnew. Chem. Vol 75 (No. 13), pages 604–637 and 742–754, 1963, and in the Proceedings of the Chemical Society of London, Oct. 1961, pages 351–369. Many of the difunctional dipoles used in the present invention are synthesized by the same techniques described in these references as well as in U.S. Pat. Nos. 3,390,204, 3,390,132 and 3,213,068. Preferred dipole compounds are 1,4-benzenedinitrile oxide, 1,4-benzenedi(phenylnitrilimine) and 1,4-benzenedi(phenylnitrile ylide).

To increase the rate of reaction between the polyimide and bis-dipole, the concentration of the bis-dipole can be increased up to 2 moles. The reaction can take place at ambient temperatures or slightly higher, but once initiated, the temperature can go as high as the boiling point of any solvent used, usually a phenol or the accepted aprotic polymer solvents disclosed in my copending application Ser. No. 363,799, filed May 25, 1973.

The bis-maleimides described above are known to react with dipoles, but the thermal stability of the resulting product is low. I have discovered that if polyimide character, i.e.,

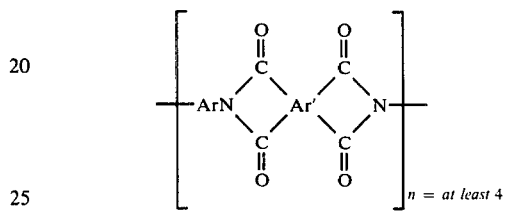

is interjected between the maleimides, then the cycloaddition extension products have improved thermal stability.

The reaction between the bis-dipolar compound and the reactive end group is a 1,3-dipolar cycloaddition reaction which does not eliminate by-products during the course of propagation. For example, if styryl is the reactive end group and 1,4-benzenedinitrile oxide is used as the dipolar compound, the mode of propagation can be shown as follows:

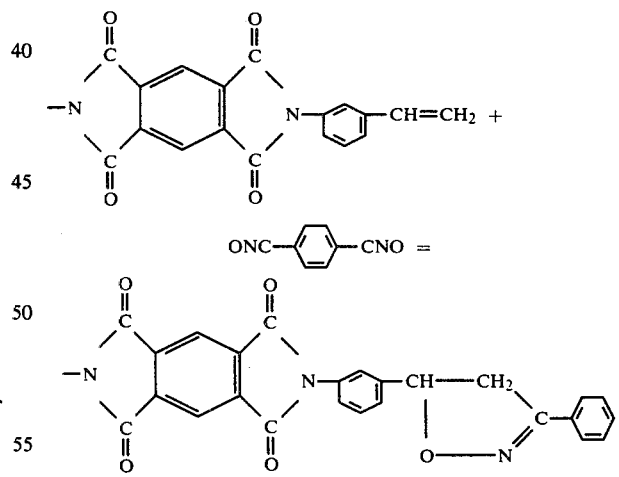

When the terminal groups are —OH, the complementary organic compound is formaldehyde, a compound capable of generating formaldehyde under the reaction conditions such as paraformaldehyde or hexamethylene tetramine. The reaction is preferably carried out in the presence of lime as a catalyst with about 1 to 5 weight percent lime, based on the weight of polyimide, usually being sufficient. The amount of formaldehyde used is usually in the range of about 10 to 15% by weight, based on the weight of polyimide, but can range from about 5 to 25% by weight and even higher; however, there is usually no economic incentive for using higher concentrations.

The dianhydride terminated polyimides are chain-extended by reacting them with an aromatic diisocyanate of the formula Ar(NCO)$_2$ wherein Ar is a divalent aromatic organic radical preferably such as tolylene (CH$_3$C$_6$H$_3$<), xylylene (—CH$_2$C$_6$H$_4$CH$_2$—), benzylene (—C$_6$H$_4$CH$_2$—), phenylene (C$_6$H$_4$<), naphthylene (C$_{10}$H$_6$<), diphenylene (C$_{12}$H$_8$<) and generally any of the other Ar radicals listed with the aromatic diamines above, to yield thermally stable foams under appropriate processing conditions.

The anhydride terminated polyimides can also be chain-extended by reacting them with any of the aromatic diamines previously described, preferably sulfonyl dianiline and oxydianiline, or by reacting them with a diamine terminated imide oligomer which can be prepared by my aforesaid application Ser. No. 363,800, filed May 25, 1973. This oligomer has the formula:

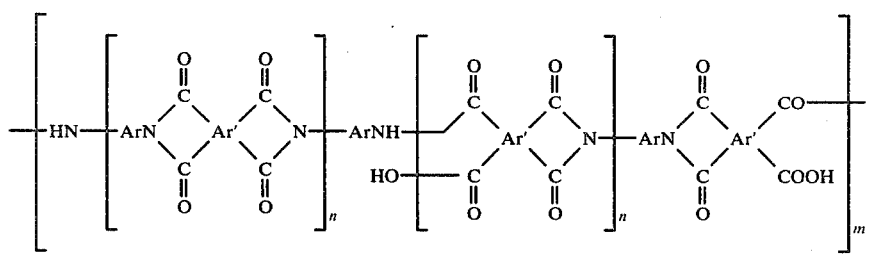

wherein
Ar and Ar' have been defined previously and,
n' is zero or a positive integer of at least 1. The reaction of the diamine and diamine terminated oligomer with the dianhydride preferably can be carried out at a temperature above the melting point of the materials involved or preferably in the phenol solvent defined previously, preferably m-cresol or a mixture of m-cresol with its other isomers, as well as in any of the accepted aprotic polymer solvents mentioned previously.

The chain-extension described above occurs by the reaction of the terminal —ArNH$_2$ groups in the diamine or diamine terminated oligomer of formula (B) with the terminal anhydride groups of the oligomer of formula (A), with the formation of amic acid structures

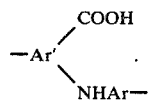

This reaction preferably occurs by simply mixing a solution of the diamine compounds of formula (B) with a solution of the compounds of formula (A) in the presence of a phenol of the structure

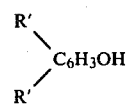

which has been described previously. Since the compounds of formula (A) and formula (B) are difunctional, it would be expected that propagation, i.e. chain-extension by end-coupling, would occur to such a degree that the viscosity would increase to such an extent that the application of such mixed solutions would be technically unfeasible or impractical.

Surprisingly, it has been discovered that when the compounds of formula (A) and formula (B) are reacted in the presence of a phenol, there is only a slight increase in viscosity. This tends to indicate that short chain lengths are formed such as exemplified by the following structure:

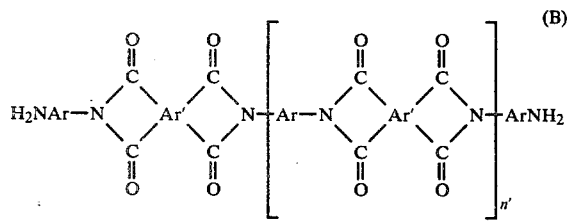

where m represents the number of moles of (A) and (B) that have reacted—perhaps only 1 or 2. Thus, the viscosity can remain constant for a long period of time. When the phenol is removed, for example by evaporation or distillation, chain-extension continues and the viscosity increases progressively as the phenol is eliminated to give a value of m up to 100 to 1000 or more. However, when the compounds of formula (A) and formula (B) are reacted in solvents such as dimethyl formamide (DMF), dimethyl acetamide (DMAC), dimethyl sulfoxide (DMSO) and the like in the complete absence of a phenol, marked increases in viscosity are observed and unworkable gels are obtained in some cases.

The mechanism by which the phenol exerts effective control on the chain-extending process is not completely understood but it seems reasonable to assume that the phenol forms a complex with the diamine compound of formula (B) and that the resulting anilinium phenate inactivates at least a portion of the terminal amino groups. According to this theory, at least two moles of the phenol are required to complex with one mole of the compound of formula (B). However, since the equilibrium constant to the anilinium phenate side of the equation appears to be less than the constant to the reactant side, an excess over molar requirements of the phenol is preferred—up to and including the use of the phenol as the sole solvent or medium in which the reaction is performed. When the reaction of compound (A) with compound (B) is performed in a solvent or a liquid medium other than a phenol, then at least two moles, preferably 4–6 moles, of the phenol are used for each mole of the diamine compound or oligomer.

Many advantages accrue to the use of the process of this invention, particularly to the control of viscosity per extent of solids content. One important advantage is that the amount of water of cyclization is reduced to the extent that n and n' represent closed rings which cannot eliminate water of reaction. Thus, films, laminates and molded or formed products of low or negligible porosity are obtained having good physical and electrical properties.

The diamine terminated polyimides are chain-extended by reacting them with an anhydride of the formula

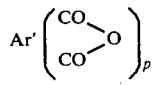

wherein p is 2 or 3 and Ar' is any of the radicals listed with the aromatic dianhydrides above when p is 2. When p is 3 Ar' is a hexavalent aromatic organic radical, the six carbonyl groups being attached directly to separate carbon atoms and each pair of carbonyl groups being attached to adjacent carbon atoms in the Ar' radical. Preferred anhydrides are mellitic dianhydride, mellitic trianhydride and 3,3',4,4'-benzophenonetetracarboxylic acid dianhydride. This reaction can be carried out at a temperature above the melting point of the diamine terminated polyimide or preferably in any of the solvents defined previously (preferably m-cresol or a mixture of m-cresol and its isomers). Instead of the di- or trianhydride, its corresponding tetra or hexa carboxylic acid can be used.

The polyimides of the present invention have a number of uses. These include use of the solutions before curing as wire and insulating varnishes and to impregnate fabric substrates used in making flexible and rigid electronic circuit boards and in making structural laminates. The solutions can be used to make fibers and films and as adhesives, particularly for film substrates, useful in aerospace and electronics applications. The powders can be used as molding powders and to make fibers, films and foams.

The invention can be further understood by the following examples in which parts and percentages are by weight unless otherwise indicated.

EXAMPLE 1

(a) Preparation of Amine-Terminated Oligomeric Polyimide (BTAT-3). Reaction of BTCA and ODA (7:8).

An apparatus consisting of a 100 ml. three-neck, round-bottom flask equipped with a magnetic stirrer, Dean-Stark trap and condenser, a dropping funnel, heating mantle, etc. is used in this and numerous following syntheses. For purposes of brevity, it will be called "the m-cresol:benzene azeotropic apparatus."

In the m-cresol:benzene azeotropic apparatus was placed 4,4'-oxydianiline (ODA) (3.204 g., 0.016 mole) in 20 ml. of m-cresol and 10 ml. of benzene. After warming to 60° C., a solution of 3,3',4,4'-benzophenonetetracarboxylic acid dianhydride (BTCA) (4.512 g., 0.014 mole) in 30 ml. m-cresol was added. A copious yellow precipitate formed immediately. The reaction mixture was heated to reflux and the solid material dissolved, forming an orange solution. After 2 hours of reflux, 0.30 ml. of water had been collected and a precipitate had formed in the reaction flask. After cooling, the reaction mixture was concentrated on a rotary flash evaporator and then vacuum-dried at 170° C. to give 7.0960 g. (~100%) of a yellow solid which was slightly soluble in m-cresol, and insoluble in sulfolane and DMAC. On a Fisher-Johns melting point apparatus it softened slightly at about 210° C., partially melted by 235° C., and rehardened to a granular solid at 240° C.

Analysis: Calc'd. for $C_{215}H_{110}N_{16}O_{43}$: C, 72.18; H, 3.10; N, 5.48. Found: C, 70.26; H, 3.26; N, 6.11.

(b) Preparation of Oligomeric Anhydride (BTOD-1). Reaction of BTCA and ODA (2:1).

Into a 100 ml. three-neck, round-bottom flask equipped with a magnetic stirrer, thermometer, condenser, gas inlet tube, dropping funnel, etc. there was place, under nitrogen atmosphere, a solution of BTCA (6.444 g., 0.02 mole) in 25 ml. of DMAC. Then, a solution of ODA (2.00 g., 0.01 mole) in 15 ml. of DMAC was added over a period of 15 minutes. The reaction, which was exothermic, was maintained at 40° C. during the addition, following which it was heated at 85°-90° C. for 15 minutes. To this clear amber-colored solution, acetic anhydride (3.06 g., 0.03 mole) was added and the mixture was heated to 125° C. Within 15 minutes, a yellow precipitate formed. After heating, the reaction mixture for 1 hour, the solvents were removed in a rotary flash evaporator. The residual light-yellow solid was washed with anhydrous ether and dried in a vacuum oven at 140° C., to afford a quantitative yield. It softened slightly on a Fisher-Johns melting point apparatus at 120° C. and did not melt when heated to 300° C. The product was soluble in m-cresol and N-methyl-2-pyrrolidone and only slightly soluble in boiling benzonitrile, acetophenone or DMAC.

Its infrared spectrum shows the peaks for $-C=O$ of the anhydride group at 4.50 and 5.63μ, and for the imide $C=O$, at 5.82μ.

Analysis: Calc'd. for $C_{46}H_{20}N_2O_{13}$: C, 68.32; H, 2.49; N, 3.47. Found: C, 68.27; H, 2.82; N, 3.79.

(c) Melt reaction of BTAT-3 and BTOD-1.

An intimate mixture of equimolar amounts of BTOD-1 and BTAT-3 was placed between glass plates and placed on a block preheated to 250° C. The sample melted and rehardened within 3 minutes. Then, as the temperature was raised at 5° C./minute, the same resoftened at 290° C., and rehardened at about 325° C.

EXAMPLE 2

(a) Preparation of Foamed Polyimide (BTFM-1). Reaction of BTOD-1 and Tolylene-2,4-diisocyanate (TDI) (1:1).

An intimate mixture of BTOD-1 prepared in Example 1 (b) (0.081 g., 0.0001 mole) and TDI (0.017 gl, 0.0001 mole) was prepared in a Wig-L-jig apparatus. A small sample of the mixture was placed between glass plates and placed onto a block preheated to 250° C. The entire sample melted, foamed and hardened within 1 minute.

(b) Preparation of Foamed Polyimide (BTFM-2). Reaction of BTOD-1 and TDI (1:2).

An intimate mixture of BTOD-1 prepared in Example 1 (b) (0.81 g., 0.0001 mole) and TDI (0.034 g., 0.0002 mole) was prepared in a Wig-L-jig apparatus. A small sample of the mixture was placed between glass plates and placed onto a block preheated to 250° C. The entire sample melted, foamed and hardened within 10 seconds. The volume increase was noticeably greater in this case than (a) above.

EXAMPLE 3

(a) Preparation of Styrene-Terminated Oligomeric Polyimide (BTAS-4). Reaction of BTCA, DAPB-3,3, ODA and AS in 9:(4:4):2 Mole Ratio.

In a large-scale m-cresol:benzene azeotropic apparatus was placed, under a slow nitrogen sweep, BTCA (21.7505 g. 0.0675 mole), 175 ml. of m-cresol and 50 ml. of benzene. The mixture was warmed to approximately 70° C. to dissolve the BTCA and then a solution of m-aminostyrene (AS) (1.7874 g., 0.015 mole) in 25 ml. of m-cresol, containing 0.1 g. of t-butyl catechol, was added over approximately ½ hour. The solution was then refluxed for 20 minutes. Then a solution of 1,3-di(3-aminophenoxy)benzene (DAPB-3,3) (8.7699 g., 0.030 mole) and ODA (6.0072 g., 0.030 mole) in 75 ml. of m-cresol was added. Reflux was maintained for 3 hours; 2.47 ml. of water was collected. Then 50 ml. of benzene was distilled off.

After cooling to ambient temperature, the clear solution was added dropwise to 600 ml. of well-stirred methanol. After stirring for 2 hours, the solution was filtered. The isolated solid was heated in 200 ml. of boiling methanol containing approximately 0.1 g. of t-butyl catechol for 1 hour and filtered. The methanol wash was repeated three times. A small portion of the solid was removed and treated in boiling inhibitor-free methanol. This small sample was used for testing purposes, such as melting behavior, solubility, etc. The remainder of the material was vacuum-dried at ambient temperature for 40 hours, to give BTAS-4 as a yellow solid, 36.9 g. (103%). A TGA in nitrogen showed a loss of approximately 5% volatiles before an inflection point at approximately 510° C. The sample was washed once more with hot methanol and vacuum-dried at 40° C. for 16 hours to give 35.3 g. (98%). A TGA in nitrogen showed approximately 2% volatiles.

BTAS-4 was soluble in m-cresol and sulfolane, was partially soluble in hot DMAC and hot DMF, swelled slightly in dioxane, styrene, 75% DVB and chloroform, but was insoluble in methanol and benzene. When heated from ambient to higher temperatures on a Fisher-Johns melting point block, BTAS-4 softened at 185°–205° C., was partially molten at approximately 220° C., was a thick melt 235° C., and hardened after 20 minutes at 300° C. Its TGA in nitrogen showed an inflection point at approximately 510° C. and a 58% residue at 1000° C. The DTA displayed an endotherm (softening or melting) in the region of 190° C., which was followed immediately by a strong exotherm (polymerization) in the region of 190°–210° C., followed by a weak endotherm which blends into a second mild exotherm at approximately 260° C. A 0.20 g. sample of BTAS-4 was heated in an air oven at 200° C. for 5 hours to give BTAS-4-H200. The TGA of BTAS-4-H200 in nitrogen and in air showed the samples to be substantially free of m-cresol. The inflection points in nitrogen and in air are almost identical in the 500° C. region; the difference in nitrogen and in air is found in a chair residue of 60% to 0% respectively, at temperatures higher than 600° C.

Analysis: Calc'd. for $C_{289}H_{148}N_{18}O_{57}$: C, 72.55; H, 3.12; N, 5.27; O, 19.06. Found: C, 72.54; H, 3.20; N, 5.32; O, . . . .

(b) Reaction of BTAS-4 with ODA.

To a solution of BTAS-4 (0.4882 g., 0.0001 mole) in 14 ml. of m-cresol was added a solution of ODA (0.020 g., 0.0001 mole) in 1 ml. of m-cresol. The solutions were mixed in a small flask and placed in an air oven at 100° C. The temperature was raised slowly to 200° C. over a period of 6 hours to eliminate solvent and maintained at 200° C. for 24 hours. The cured product was obtained as dark-brown chips. The product was hard and tough, and required grinding in Wig-l-jig apparatus for 10 minutes to produce a powder, which was vacuum-dried at 200° C. for 24 hours, to give 0.5091 g. (100%). Its infrared spectrum (KBr disc) was recorded. Its TGA in nitrogen and in air showed, in both cases, inflection points in the region of 500° C. The product cured at 200° C. was insoluble in boiling m-cresol.

(c) Thermal Polymerization of BTAS-4 in m-Cresol.

BTAS-4 (0.4882 g., 0.0001 mole) in 5 ml. of m-cresol was heated according to the schedule given directly above to afford 0.4778 g. (98%) of dark glassy chips. Its infrared spectrum was recorded. Its TGA in nitrogen showed an inflection point in the 500° C. region. The product cured at 200° C. is insoluble in boiling m-cresol.

(d) Thermal Catalyzed Polymerization of BTAS-4.

BTAS-4 (0.4882 g., 0.0001 mole) and benzoyl peroxide (0.005 g.) in 5 ml. of m-cresol were heated according to the schedule given above. There was obtained 0.4820 g. (99%) of a dark glassy solid. Its infrared spectrum was similar to that of cured BTAS-4.

EXAMPLE 4

(a) Preparation of Styrene-Terminated Oligomeric Polyimide (BTAS-9). Reaction of BTCA, DAPB-3,3, and AS in 9:8:2 Mole Ratio.

In an m-cresol:benzene azeotropic apparatus was placed, under a slow nitrogen sweep, BTCA (2.175 g., 0.0675 mole), 10 ml. of m-cresol and 10 ml. of benzene. The mixture was warmed to approximately 70° C. to dissolve the BTCA and then a solution of AS (0.1787 g., 0.015 mole) in 25 ml. of m-cresol, containing 0.1 g. of t-butyl catechol, was added over approximately ⅓ hour. The solution was then refluxed for 20 minutes. Then a solution of DAPB-3,3 (1.7540 g., 0.060 mole) in 7.5 ml. of m-cresol was added. Reflux was maintained for 3 hours and then 10 ml. of benzene was distilled off.

After cooling to ambient temperature, the clear solution was added dropwise to 600 ml. of well-stirred methanol. After stirring for 2 hours, the solution was filtered. The isolated solid was heated in 200 ml. of boiling methanol containing approximately 0.1 g. of t-butyl catechol for 1 hour and filtered. The methanol wash was repeated three times. A small portion of the solid was removed and treated in boiling inhibitor-free methanol. This small sample was used for testing purposes, such as melting behavior, solubility, etc. The remainder of the material was vacuum-dried at ambient temperature for 40 hours, to give BTAS-9 as a light-yellow solid, 3.6 g. (92%).

BTAS-9 was soluble in m-cresol, DMAC, DMF, sulfolane, dioxane, chloroform and methylene chloride; it was partially soluble in hot tetrahydrofuran; it swelled in divinyl benzene, cis-1,2-dichloroethylene and methyl methacrylate and was insoluble in methylethyl ketone and trans-1,2-dichloroethylene. BTAS-9 melts in the 170°–205° C. range, thickens above 210° C. and rehardens at 230° C.

A small sample was vacuum dried at 200° C. to yield BTAS-9-H200 and analyzed.

Analysis: Calc'd. for $C_{313}H_{164}N_{18}O_{61}$: C, 72.96; H, 3.21; N, 4.89; O, 18.94. Found: C, 73.04; H, 3.39; N, 4.64; O, -----.

(b) Catalyzed Polymerization of BTAS-9.

In a small beaker was placed in a solution of the oligomer BTAS-9 (0.250 g.) in 5 ml. of DMAC. Then there was added benzoyl peroxide (0.00259) and the solution was placed in an air oven at 100° C. for 24 hours. Then the temperature was raised to 200° C. over 8 hours and then maintained at 200° C. for 60 hours. There was obtained a dark film (BTAS-9-cured). The polymer was insoluble in hot m-cresol.

EXAMPLE 5

(a) Preparation of Styrene-Terminated Oligomeric Polyimide (NTAS-1). Reation of 1,4,5,8-Naphthalenetetracarboxylic Acid Dianhydride (NTCA), DAPB-3,3 and AS (9:8:2).

Using the m-cresol:benzene azeotropic apparatus procedure described previously, there was allowed to react 1,4,5,8-naphthalene-tetracarboxylic acid dianhydride (NTCA) (2.8369 g., 0.01125 mole), DAPB-3,3 (2.9233 g., 0.01 mole) and AS (0.2979 g., 0.0025 mole). There was obtained NTAS-1, 4.4712 g. (79.1%) as a tan powder which partially melted, with darkening at 220°–260° C., rehardened at 265° C., and then did not change up to 300° C. When a sample was placed on a Fisher-Johns apparatus at approximately 220° C., it became completely molten by 260° C. and rehardened at about 265° C.

NTAS-1 was soluble in DMAC, m-cresol, sulfolane and concentrated sulfuric acid, and swelled in hot dioxane. Its infrared spectrum was consistent with that expected for the compound.

Analysis: Calc'd. for $C_{286}H_{146}N_{18}O_{52}$: C, 73.61; H, 3.15; N, 5.40; O, 17.83. Found: C, 73.74; H, 3.50; N, 5.83; O, -----.

(b) Catalyzed Polymerization of NTAS-1.

The oligomer, NTAS-1 (0.250 g.) in 5 ml. of DMAC was cured with benzoyl peroxide (0.0025 g.) according to the schedule given in Example 4(b). There was obtained a dark granular solid (NTAS-1-cured). The polymer was insoluble in hot m-cresol.

EXAMPLE 6

(a) Preparation of Nitrile-Terminated Oligomeric Polyimide BTAN-6. Reaction of BTCA, MDA-4,4 and AN (9:8:2).

In a m-cresol:benzene azeotropic apparatus was placed (2.1751 g., 0.0135 mole) and 4-aminobenzonitrile (AN) (0.1772 g., 0.0030 mole) in 25 ml. of m-cresol and 10 ml. of benzene. The mixture was brought to reflux and maintained at reflux for 30 minutes. Then a solution of 4,4'-methylene dianiline (MDA-4,4) (1.1896 g., 0.0120 mole) in 15 ml. of m-cresol was added and the mixture was refluxed for 30 minutes. At the end of the reflux period the theoretical amount of water had been collected and the reaction mixture was a clear yellow solution. Then the reaction mixture was added dropwise to approximately 100 ml. of methanol. The precipitated oligomer was digested three times in 100 ml. of hot methanol, filtered and vacuum-dried at 70° C. for 24 hours. A pale yellow powder, BTAN-6, 2.1102 g. (94%) was obtained. On a Fisher-Johns melting point apparatus BTAN-6 melted over the range 230°–290° C. The drop melt was 270° C. It was soluble in m-cresol and sulfolane and became swollen in DMAC and dioxane.

(b) Preparation of Nitrile-Terminated Oligomeric Polyimide BTAN-7. Reaction of BTCA, MDA-4,4, SDA-3,3 and AN (9:4+4:2).

According to the procedure reported in (a) above for the preparation of BTAN-6, there was allowed to react BTCA (2.9001 g., 0.009 mole), MDA-4,4 (0.7930 g., 0.004 mole), 3,3'-sulfonyldianiline (SDA-3,3) (0.9932 g., 0.004 mole) and AN (0.2363 g., 0.002 mole). The reaction mixture was a clear yellow solution at the end of a 3-hour reflux period. After precipitation and vacuum-drying at 70° C. for 24 hours there was obtained BTAN-7 as a pale yellow powder, 4.1594 g. (90.4%). On a Fisher-Johns apparatus BTAN-7 melted over the range 255°–285° C. The drop melt was 260° C. BTAN-7 was soluble in m-cresol, sulfolane and DMAC.

(c) Preparation of Nitrile-Terminated Oligomeric Polyimide BTAN-8. Reaction of BTCA, MDA-4,4, SDA-3,3 and AN (9:6+2:2).

The procedure reported in (a) above for the preparation of BTAN-6 was repeated except that BTCA (2.9001 g., 0.009 mole), MDA-4,4 (1.996 g., 0.006 mole), SDA-3,3 (0.4966 g., 0.002 mole), and AN (0.2363 g., 0.002 mole) were allowed to react. The reaction mixture remained clear throughout a 3-hour reflux period. After the usual isolation procedure there was obtained BTAN-8 as a pale yellow powder, 4.2198 g. (94%) which was soluble in m-cresol and sulfolane. It became swollen in DMAC. On a Fisher-Johns apparatus BTAN-8 melted over the range 240°–280° C. The drop melt was 265° C.

(d) Preparation of Nitrile-Terminated Oligomeric Polyimide BTAN-9. Reaction of BTCA, MDA-4,4, SDA-3,3 and AN (9:7+1:2).

The procedure reported in (a) above for the preparation of BTAN-6 was repeated using BTCA (2.9001 g., 0.009 mole), MDA-4,4 (1.3878 g., 0.007 mole), SDA-3,3 (0.2483 g., 0.001 mole) and AN (0.2363 g., 0.002 mole). The reaction mixture remained clear during a 3-hour reflux period. There was obtained BTAN-9 as a pale yellow powder, 4.1670 (94%) which was soluble in m-cresol, partially soluble in hot sulfolane and insoluble in DMAC. On a Fisher-Johns apparatus BTAN-9 melted over the range 230°–290° C. The drop melt was 280° C.

(e) Preparation of Nitrile-Terminated Oligomeric Polyimide BTAN-10. Reaction of BTCA, MDA-4,4, SDA-3,3 and AN (9:7.5+0.5:2).

The procedure reported in (a) above for the preparation of BTAN-6 was repeated using BTCA (2.9001 g., 0.009 mole), MDA-4,4 (0.4870 g., 0.0075 mole), SDA-3,3 (0.1242 g., 0.0005 mole) and AN (0.2363 g., 0.002 mole). At the end of a 3-hour reflux period the reaction mixture was slightly hazy. There was obtained BTAN-10 as a pale yellow powder, 4.1140 g. (93%), which was soluble in m-cresol, partially soluble in sulfolane and insoluble in DMAC. On a Fisher-Johns apparatus BTAN-10 melted over the range 250°–280° C. The drop melt was 270° C.

(f) Curing of Nitrile-Terminated Oligomeric Polyimides, BTAN-6 through BTAN-10.

Intimate mixtures (~0.25 g.) of each of the nitrile-terminated oligomeric polyimides, BTAN-6 through BTAN-10 with $Cu_2Cl_2$ (5% by weight) were prepared in a Wig-L-jig apparatus. A single mixture of BTAN-6 with $Cu_2Cl_2$ was prepared similarly. Then samples of each of the mixtures were placed into a test tube, the tube was flushed with nitrogen and capped with a nitrogen-filled balloon. The tubes were then placed into a metal block preheated to and electronically maintained at 300° C. After 2 hours the tubes were removed and allowed to cool. Then the TGA in air and in nitrogen of each of the samples was performed at 10° C./minute on a Du Pont 900. The pertinent data for these reactions are given in Table I.

TABLE I

Data on Curing of Nitrile-Terminated Oligomeric Polyimides BTAN-6 through BTAN-10.

| Oligomer | Weight (g.) | Catalyst | Weight (g.) | Atmosphere | TGA : Percent Residue at | | | | | TGA Break °C. | Inflection °C. |
|---|---|---|---|---|---|---|---|---|---|---|---|
| | | | | | 300° C. | 400° C. | 500° C. | 600° C. | 700° C. | | |
| BTAN-6 | 0.250 | $Cu_2Cl_2$ | 0.0125 | Air | 100 | 95 | 0 | 0 | 0 | 365 | — |
| | | | | $N_2$ | 100 | 99 | 94 | | 57 | 370 | 535 |
| BTAN-6 | 0.500 | $Cu_2Cl_2$ | 0.025 | Air | 100 | 98 | 8 | 0 | 0 | 360 | — |
| | | | | $N_2$ | 100 | 99 | 95 | | 59 | 370 | 550 |
| BTAN-7 | 0.250 | $Cu_2Cl_2$ | 0.0125 | Air | 100 | 98 | 0 | 0 | 0 | 350 | — |
| | | | | $N_2$ | 100 | 99 | 94 | | 58 | 360 | 540 |
| BTAN-8 | 0.250 | $Cu_2Cl_2$ | 0.0125 | Air | 100 | 98 | 0 | 0 | 0 | 370 | — |
| | | | | $N_2$ | 100 | 99 | 94 | | 62 | 370 | 550 |
| BTAN-9 | 0.250 | $Cu_2Cl_2$ | 0.0125 | Air | 100 | 88 | 0 | 0 | 0 | 340 | — |
| | | | | $N_2$ | 100 | 99 | 93 | | 60 | 360 | 545 |
| BTAN-10 | 0.250 | $Cu_2Cl_2$ | 0.0125 | Air | 100 | 85 | 0 | 0 | 0 | 340 | — |
| | | | | $N_2$ | 100 | 99 | 94 | | 57 | 350 | 555 |

EXAMPLE 7

A. Preparation of Amine Terminated Oligomers:

(a) Preparation of Amine-Terminated Oligomeric Polyimide (BTAT-4). Reaction of BTCA and SDA-3,3 (4:5).

In a m-cresol:benzene azeotropic apparatus was placed BTCA (11.2781 g., 0.035 mole), SDA-3,3 (10.8760 g., 0.0438 mole), 80 ml. of m-cresol and 10 ml. of benzene. The mixture was refluxed for 3½ hours during which time 1.3 ml. of water was collected. Then, the benzene was distilled off and the solution was precipitated in methanol. The precipitated oligomer was digested three times in hot methanol and then vacuum dried at 70° C. for 24 hours to give BTAT-4, 19.7498 g. (95%) as a light-yellow solid which was soluble in m-cresol, DMAC and sulfolane. It swelled in hot dioxane. On a Fisher-Johns apparatus, it softened slightly above 180° C., melted at 245°–280° C. and rehardened after 5 minutes at 300° C. The lowest temperature at which a sample would melt completely when dropped onto the preheated block was 270° C.

A sample was vacuum-dried at 200° C. and submitted for analysis.

Analysis: Calc'd. for $C_{128}H_{68}N_{10}O_{30}S_5$: C, 64.42; H, 2.87; N, 5.87; O, 20.12; S, 6.72. Found: C, 63.71; H, 2.91; N, 5.75; O, -----; S, ----.

(b) Preparation of Amine-Terminated Oligomeric Polyimide (BTAT-5). Reaction of BTCA and SDA-3,3 (8:9).

According to the procedure used in (a) above, there was allowed to react BTCA (11.2781 g., 0.035 mole) and SDA-3,3 (9.7834 g., 0.0394 mole) in 80 ml. of m-cresol and 10 ml. of benzene. There was obtained the oligomer, BTAT-5, as a light-yellow solid, 18.3 g. (92.5%) which was soluble in m-cresol, DMAC and sulfolane. It swelled in hot dioxane. On a Fisher-Johns apparatus it began to melt at 255° C. but was not completely melted by 300° C., at which temperature it hardened in 3 minutes. The lowest temperature at which a sample would melt completely when dropped onto the preheated block was 280° C.

The analysis was performed on a small sample vacuum-dried at 200° C.

Analysis: Calc'd. for $C_{244}H_{124}N_{18}O_{58}S_9$: C, 64.77; H, 2.76; N, 5.57; O, 20.51; S, 6.38. Found: C, 63.54; H, 2.81; N, 5.45; O, -----; S, ----.

(c) Preparation of Amine-Terminated Oligomeric Polyimide (BTAT-6). Reaction of BTCA and DAPB-3,3 (4:5).

According to the procedure in (a) above, BTCA (3.2223 g., 0.01 mole) and DAPB-3,3 (3.6529 g., 0.0125 mole) were allowed to react. There was obtained BTAT-6, 6.1215 g. (94%) as a yellow powder. On a Fisher-Johns melting point apparatus BTAT-6 melted from 180°–200° C. and rehardened after 30 minutes at 300° C. The lowest temperature at which a sample completely melted when dropped onto a preheated block was 190° C. BTAT-6 was soluble in m-cresol, DMAC, sulfolane and dioxane.

A sample was vacuum-dried at 200° C. for analysis.
Analysis: Calc'd. for $C_{158}H_{88}N_{10}O_{30}$: C, 72.81; H, 3.40; N, 5.37; O, 18.42. Found: C, 72.72; H, 3.35; N, 4.77; O, -----.

(d) Preparation of Amine-Terminated Oligomeric Polyimide (BTAT-7). Reaction of BTCA and DAPB-3,3 (8:9).

According to the procedure in (a) above, BTCA (3.2223 g., 0.01 mole) and DAPB-3,3 (3.2887 g., 0.01125 mole) were allowed to react. There was obtained BTAT-7 as a yellow powder, 5.8708 g. (95.4%). On a Fisher-Johns apparatus BTAT-7 began to melt from 190° C. but did not completely melt by 300° C., when it hardened in 30 minutes. The lowest temperature at which a sample melted when dropped onto a preheated block was 220° C. BTAT-6 was soluble in m-cresol, DMAC, sulfolane and dioxane.

A small sample was vacuum-dried at 200° C. for analysis.

Analysis: Calc'd. for $C_{298}H_{160}N_{18}O_{58}$: C, 72.74; H, 3.28; N, 5.12; O, 18.86. Found: C, 72.45; H, 3.31; N, 5.04; O, -----.

B. Preparation of Anhydride-Terminated Oligomers:

(a) Preparation of Anhydride-Terminated Oligomeric Polyimide (BTOD-3). Reaction of BTCA and SDA-3,3 (5:4).

According to the procedure used in A(a) above, there was allowed to react BTCA (12.0827 g., 0.0375 mole) and SDA-3,3 (7.4493 g., 0.03 mole) in 80 ml. of m-cresol and 10 ml. of benzene. There was obtained the oligomer BTOD-3, as a light-yellow solid, 16.9 g. (92%) which was soluble in m-cresol, DMAC, DMF and sulfolane. It softened at 240° C., melted from 245°-265° C., with the evolution of small amounts of gas, and did not harden during 30 minutes at 300° C. The lowest temperature at which a sample melted completely when dropped onto a preheated block was 255° C.

A small sample was vacuum-dried at 200° C. and submitted for analysis.

Analysis: Calc'd. for $C_{133}H_{62}N_7O_{35}S_4$: C, 65.30; H, 2.56; N, 4.01; O, 22.89; S, 5.24. Found: C, 63.90; H, 2.74; N, 4.70; O, -----; S, ----.

(b) Preparation of Anhydride-Terminated Oligomeric Polyimide (BTOD-4). Reaction of BTCA and SDA-3,3 (9:8).

According to the procedure used in A(a) above, there was allowed to react BTCA (14.5003 g., 0.045 mole) and SDA-3,3 (9.9324 g., 0.04 mole) in 90 ml. of m-cresol and 20 ml. of benzene. There was obtained the oligomer, BTOD-4, as a light-yellow solid, 21.4 g. (95%) which was soluble in m-cresol, DMAC, DMF and sulfolane. It began to melt at 265° C. with the evolution of small amounts of gas, but was not melted completely by 300° C. and did not harden during 15 minutes at 300° C. The lowest temperature at which a sample melted completely when dropped onto a preheated block was 270° C.

A small sample vacuum-dried at 200° C. was submitted for analysis.

Analysis: Calc'd. for $C_{249}H_{118}N_{15}O_{63}S_8$: C, 65.24; H, 2.60; N, 4.58; O, 21.99; S, 5.60. Found: C, 63.99; H, 2.73; N, 4.95; O, -----; S, ----.

(c) Preparation of Anhydride-Terminated Oligomeric Polyimide (BTOD-5). Reaction of BTCA and DAPB-3,3 (5:4).

According to the procedure used in A(a) above, there was allowed to react BTCA (4.0279 g., 0.0125 mole) and DAPB-3,3 (2.9223 g., 0.01 mole) in 40 ml. of m-cresol and 10 ml. of benzene. There was obtained the oligomer BTOD-5 -(5.7678 g., 80%) as a light-yellow powder which was soluble in m-cresol, DMAC, sulfolane and dioxane. On a Fisher-Johns melting point apparatus BTOD-5 melted over the range of 190°-205° C. with gas evolution and did not harden during 10 minutes at 300° C. The lowest temperature at which a sample melted completely when dropped onto a preheated block was 200° C.

Analysis: Calc'd. for $C_{157}H_{78}N_8O_{35}$: C, 71.52; H, 2.98; N, 4.25; O, 21.24. Found: C, 71.41; H, 3.21; N, 4.46; O, -----.

(d) Preparation of Foamed Polymer by Reaction of a Diisocyanate and an Oligomeric Anhydride Terminated Polyimide.

The procedure of Example 7B(c) was used to prepare an oligomer of BTCA and DAPB-3,3 in a 9:8 mole ratio (BTOD-20).

A mixture of oligomer (BTOD-20) (0.5495 g., $1 \times 10^4$ mole) and TDI (0.0522 g., $3 \times 10^4$ mole) was packed tightly into a pyrex tube. The tube was then flushed well with nitrogen gas, and a balloon, which was filled with nitrogen gas, was attached to the pyrex tube. The tube was then inserted into a thermostatically controlled metal block, preheated to 225° C., causing the mixture to form a foamed structure within a few minutes, which did not collapse when heating was continued for 3 hours. A sample of the foamed product was insoluble in cold m-cresol but swelled in hot m-cresol. The foamed product was then heated at 300° C. in air over 2 hours whose TGA in air showed an inflection point in the 525° C. region. In nitrogen the clear residue at 1000° C. amounted to 60%.

C. Preparation of Polyimide Polymer Components:

Intimate mixtures of the various reactants prepared in A. and B. above and BTCA, SDA-3,3 and mellitic trianhydride (MTA) were prepared for polymerization in a Wig-L-jig apparatus. The various polymers and their components are listed in Table II.

TABLE II

Components Used in the Preparation of PTB-Type Polymers

| Polymer | Amine or Amine-Terminated Oligomer (grams, moles) | Anhydride or Anhydride-Terminated Oligomer (grams, moles) | Crosslinking Agent grams, moles |
|---|---|---|---|
| PIB-1 | BTAT-4<br>0.2393 g., 0.0001 m | BTOD-3<br>0.2446 g., 0.0001 m | none |
| PIB-1A | BTAT-4<br>0.2393 g., 0.0001 m | BTOD-3<br>0.2446 g., 0.0001 m | BTAT-4<br>0.0239 g., 0.00001 m |
| PIB-1B | BTAT-4<br>0.2393 g., 0.0001 m | BTOD-3<br>0.2246 g., 0.0001 m | BTAT-4<br>0.1196 g., 0.00005 m |
| PIB-1C | BTAT-4<br>0.2393 g., 0.0001 m | BTOD-3<br>0.2446 g., 0.0001 m | BTAT-4<br>0.2393 g., 0.0001 m |
| PIB-1D | BTAT-4<br>0.2393 g., 0.00001 m | BTOD-3<br>0.2446 g., 0.0001 m | SDA-3,3<br>0.0025 g., 0.00001 m |
| PIB-1E | BTAT-4<br>0.2393 g., 0.0001 m | BTOD-3<br>0.2446 g., 0.0001 m | SDA-3,3<br>0.0125 g., 0.00005 m |
| PIB-1F | BTAT-4<br>0.2393 g., 0.0001 m | BTOD-3<br>0.2446 g., 0.0001 m | SDA-3,3<br>0.025 g., 0.0001 m |
| PIB-2 | BTAT-5<br>0.2268 g., 0.00005 m | BTOD-4<br>0.2289 g., 0.00005 | none |

TABLE II-continued

Components Used in the Preparation of PTB-Type Polymers

| Polymer | Amine or Amine-Terminated Oligomer (grams, moles) | Anhydride or Anhydride-Terminated Oligomer (grams, moles) | Crosslinking Agent grams, moles |
|---|---|---|---|
| PIB-3 | BTAT-5<br>0.4524 g., 0.0001 m | BTOD-3<br>0.2446 g., 0.0001 m | none |
| PIB-4 | BTAT-4<br>0.2262 g., 0.00005 m | BTOD-4<br>0.2290 g., 0.00005 m | none |
| PIB-5 | SDA-3,3<br>0.496 g., 0.0002 m | BTOD-3<br>0.4892 g., 0.0002 m | none |
| PIB-6 | SDA-3,3<br>0.0248 g., 0.0001 m | BTOD-4<br>0.4584 g., 0.0001 m | none |
| PIB-7 | BTAT-4<br>0.4772 g., 0.0002 m | BTCA<br>0.0644 g., 0.0002 m | none |
| PIB-8 | BTAT-5<br>0.4524 g., 0.0001 m | BTCA<br>0.0322 g., 0.0001 m | none |
| PIB-9 | BTAT-4<br>0.5011 g., 0.00021 m | none | MTA<br>0.0403 g., 0.00014 m |
| PIB-10 | BTAT-5<br>0.4072 g., 0.00009 m | none | MTA<br>0.0173 g., 0.00006 m |
| PIB-11 | BTAT-6<br>0.2606 g., 0.0001 m | BTOD-5<br>0.2636 g., 0.0001 m | none |
| PIB-12 | BTAT-7<br>0.2460 g., 0.00005 m | BTOD-5<br>0.2476 g., 0.00005 m | none |
| PIB-13 | BTAT-7<br>0.4920 g., 0.0001 m | BTOD-5<br>0.2636 g., 0.0001 m | none |
| PIB-14 | BTAT-6<br>0.2606 g., 0.0001 m | BTOD-6<br>0.4952 g., 0.0001 m | none |
| PIB-15 | DAPB-3,3<br>0.0584 g., 0.0002 m | BTOD-5<br>0.5272 g., 0.0002 m | none |
| PIB-16 | DAPB-3,3<br>0.1922 g., 0.0001 m | BTOD-6<br>0.4952 g., 0.0001 m | none |
| PIB-17 | BTAT-6<br>0.5212 g., 0.0002 m | BTCA<br>0.0664 g., 0.0002 m | none |
| PIB-18 | BTAT-7<br>0.4920 g., 0.0001 m | BTCA<br>0.0322 g., 0.0001 m | none |
| PIB-19 | BTAT-6<br>0.5212 g., 0.0002 m | none | MTA<br>0.0384 g., 0.000133 m |
| PIB-20 | BTAT-7<br>0.4920 g., 0.0001 m | none | MTA<br>0.0192 g., 0.000067 m |

D. Preparation of Polyimides By Melt Reaction:

Small portions of the mixtures prepared in C. above were placed between glass slides and then the slides were dropped onto a preheated, electronically thermostatically controlled metal block. The samples were observed for 15 minutes and then removed. Observations in melting behavior, rehardening and solubility in m-cresol are given in Table III. Then the temperature of the metal block was raised and similar observations were made both on the samples preheated for 15 minutes and on new samples. These observations are also given in Table III. The suffix M designates the polymer as prepared by a melt reaction.

TABLE III

Data and Observations on the Preparation of PIB-Type Polyimides by Melt Reactions

| Polymer | $T_1°, T_2°$ °C. | Observations at $T_1°$ | (sample from $T_1°$) at $T_2°$ | New Sample at $T_2°$ |
|---|---|---|---|---|
| PIB-1-M | 265, 300 | partial melt, hard in 2 min., swollen in hot m-cresol | partial melt, hard in 20 min., slightly swollen in hot m-cresol | complete melt, hard in 3 min., swollen in hot m-cresol |
| PIB-2-M | 265, 300 | partial melt, hard in 5 min., swollen in hot m-cresol | partial melt, hard in 15 min., swollen in hot m-cresol | complete melt, hard in 5 min., swollen in hot m-cresol |
| PIB-3-M | 265, 300 | slightly melted, rehardened immediately, swollen in hot m-cresol | partial melt, hard in 20 min., swollen in hot m-cresol | complete melt, hard in 5 min., slightly swollen in hot m-cresol |
| PIB-4-M | 265, 300 | complete melt with applied pressure, hard in 10 min., soluble in hot m-cresol | partial melt, hard in 20 min., swollen in hot m-cresol | complete melt, hard in 5 min., slightly swollen in hot m-cresol |
| PIB-5-M | 265, 300 | complete melt, hard in 5 min., swollen in hot m-cresol | partial melt, hard in 15 min., swollen in hot m-cresol | complete melt, bubbled, hard in 15 min., swollen in hot m-cresol |
| PIB-6-M | 265, 300 | complete melt, hard in 5 min., swollen in hot m-cresol | partial melt, hard in 20 min., swollen in hot m-cresol | complete melt, bubbled, hard in 10 min., swollen in hot m-cresol |
| PIB-7-M | 265, 300 | complete melt, bubbled, hard in 5 min., partially soluble in hot m-cresol | complete melt, bubbled, hard in 25 min., swollen in hot m-cresol | complete melt, bubbled, hard in 90 min., swollen in hot m-cresol |
| | | partial melt, hardened imme- | slow partial melt, hard in | complete melt, bubbled, hard |

TABLE III-continued

Data and Observations on the Preparation of PIB-Type Polyimides by Melt Reactions

| Polymer | $T_1°, T_2°$ °C. | Observations at $T_1°$ | (sample from $T_1°$) at $T_2°$ | New Sample at $T_2°$ |
|---|---|---|---|---|
| PIB-8-M | 265, 300 | diately, swollen in hot m-cresol | 25 min., slightly swollen in hot m-cresol | in 5 min., slightly swollen in hot m-cresol |
| PIB-9-M | 265, 300 | partial melt, hard in 3 min., swollen in hot m-cresol | slight melt, hard in 5 min., swollen in hot m-cresol | partial melt, bubbled, hard in 5 min., swollen in hot m-cresol |
| PIB-10-M | 265, 300 | partial melt, hard in 3 min., soluble in hot m-cresol | slight melt, hard in 5 min., swollen in hot m-cresol | partial melt, hard in 5 min., swollen in hot m-cresol |
| PIB-11-M | 225, 300 | complete melt, bubbled, hard in 15 min. | softened, remained elastic for 90 min. | complete melt, bubbled, elastic for 90 min. |
| PIB-12-M | 225, 300 | complete melt, bubbled, hard in 10 min. | complete melt, bubbled, elastic for 90 min. | complete melt, bubbled, elastic for 90 min. |
| PIB-13-M | 225, 300 | complete melt, bubbled, hard in 20 min. | complete melt, remained elastic for 90 min. | complete melt, bubbled, elastic for 90 min. |
| PIB-14-M | 225, 300 | complete melt, bubbled, elastic, not hard in 1 hour | complete melt, remained elastic for 90 min. | complete melt, bubbled, elastic for 90 min. |
| PIB-15-M | 225, 300 | complete melt, bubbled, hard in 6 min. | slightly melted, hard in 30 min. | complete melt, bubbled, hard in 20 min. |
| PIB-16-M | 225, 300 | complete melt, bubbled, hard in 10 min. | partial melt, bubbled, elastic for 90 min. | complete melt, bubbled, elastic for 90 min. |
| PIB-17-M | 225, 300 | complete melt, bubbled, hard in 40 min. | complete melt, few bubbles, elastic for 90 min. | complete melt, bubbled, elastic for 90 min. |
| PIB-18-M | 225, 300 | complete melt, bubbled, hard in 30 min. | complete melt, elastic for 90 min. | complete melt, bubbled, elastic for 30 min. |
| PIB-19-M | 225, 300 | complete melt, bubbled, hard in 1 hour | slightly melted, elastic for 90 min. | complete melt, few bubbles, hard in 30 min. |
| PIB-20-M | 225, 300 | complete melt, hard in 1 hour | partial melt, hard in 1 hour | complete melt, bubbled, elastic for 2 hours |

E. Preparation of Polyimides By Solution Reactions:

Weighed samples (0.25 g.) of each of the mixtures prepared in C. above were added to 2.5 ml. of solvent and allowed to stand at ambient temperature for 24 hours with occasional swirling. Then the samples were treated to one of the heating schedules given below.

Heating Schedule A. The solutions were heated in an air oven at 100° C. for 15 minutes. Precipitation did not occur. Then the samples were heated in an air oven at 100° C. for 3 hours; then at 150° C. for 24 hours; and finally at 200° C. for 24 hours. Then, small portions of the films obtained were dried in an air oven at 300° C. for 20 hours. The observations are given in Table IV in which the suffix S designates the polymer as one prepared in solution. TGA data for selected PIB-type polyimides is given in Table V.

Heating Schedule B. The solutions were heated at 50° C. for 30 minutes. Precipitation did not occur. Then the samples were heated in a forced air oven at 40° C. for 20 hours, then at 100° C. for 4 hours. Then the samples were removed and a small piece of the film was chipped off. The chips were tested for softening or melting by placing them between glass slides and dropping the assembly onto a metal block preheated at 180° C. These observations are given in Table IV. Then the remainder of the films was heated at 200° C. for 72 hours and then cooled. Observations on the products are given in Table IV. Suffix S indicates a solution reaction. TGA data for selected PIB-type polyimides is given in Table V.

TABLE IV

Data and Observations on the Preparation of PIB-Type Polyimides in Solution

| Polymer | Solvent | Heating Schedule | Observations |
|---|---|---|---|
| PIB-1-S | m-cresol | A | deep red smooth film, good adhesion to glass vessel. |
| PIB-1A-S | m-cresol | A | very dark red smooth film, better adhesion to glass than PIB-1-S |
| PIB-1B-S | m-cresol | A | very dark red smooth film, better adhesion to glass vessel than PIB-1-S |
| PIB-1C-S | m-cresol | A | very dark red smooth film, better adhesion to glass vessel than PIB-1-S |
| PIB-1D-S | m-cresol | A | very dark red smooth film, better adhesion to glass vessel than PIB-1-S |
| PIB-1E-S | m-cresol | A | very dark red smooth film, better adhesion to glass vessel than PIB-1-S |
| PIB-1F-S | m-cresol | A | very dark red smooth film, less adhesion to glass vessel than PIB-1-S |
| PIB-2-S | m-cresol | A | deep red smooth film, good adhesion to glass vessel |
| PIB-3-S | m-cresol | A | deep red smooth film, good adhesion to glass vessel |
| PIB-4-S | m-cresol | A | lighter red smooth film, good adhesion to glass vessel |
| | | | deep red smooth film, good adhesion to |

TABLE IV-continued

Data and Observations on the Preparation of PIB-Type Polyimides in Solution

| Polymer | Solvent | Heating Schedule | Observations |
| --- | --- | --- | --- |
| PIB-5-S | m-cresol | A | ligher red smooth film, good adhesion to glass vessel |
| PIB-6-S | m-cresol | A | ligher red smooth film, good adhesion to glass vessel |
| PIB-7-S | m-cresol | A | lighter red smooth film, good adhesion to glass vessel |
| PIB-8-S | m-cresol | A | very deep red smooth film, good adhesion to glass vessel |
| PIB-9-S | m-cresol | A | dark-brown smooth film, good adhesion to glass vessel |
| PIB-10-S | m-cresol | A | dark-brown smooth film, with small amount of very fine particles, good adhesion to glass vessel |
| PIB-11-S | dioxane | B | H100: good yellow film; H180: melted, bubbled, hardened in 10 sec.; H200: foamed, tough film |
| PIB-12-S | dioxane | B | H100: some solid in yellow film; H180: melted, bubbled, hardened in 20 min.; H200: foamed, tough film |
| PIB-13-S | dioxane | B | H100: some solid in yellow film; H180: melted, bubbled, hardened in 1 min.; H200: foamed, tough film |
| PIB-14-S | dioxane | B | H100: good yellow film; H180: melted, bubbled, hardened in 1 min.; H200: foamed, tough film |
| PIB-15-S | dioxane | B | H100: good yellow film; H180: melted, bubbled, hardened in 1 min.; H200: foamed, tough film |
| PIB-16-S | dioxane | B | H100: good yellow film; H180: melted, bubbled, hardened in 1 min.; H200: foamed, tough film |
| PIB-17-S | dioxane | B | H100: good yellow film; H180: melted, bubbled, hardened in 1 min.; H200: foamed, tough film |
| PIB-18-S | dioxane | B | H100: good yellow film; H180: melted, bubbled, hardened in 1 min.; H200: foamed, tough film |
| PIB-19-S | dioxane | B | solution gelled in 1/2 hr.; H100: good yellow film; H180: softened, not hard in 1 hr.; H200: few bubbled, tough film |
| PIB-20-S | dioxane | B | solution gelled in 1/2 hr.; H100: good yellow film; H180: softened, not hard in 1 hr.; H200: few bubbles, tough film |

TABLE V

TGA Data for Selected PIB-Type Polyimides

| Polymer | Atmosphere | TGA: Percent Residue at | | | | | | |
| --- | --- | --- | --- | --- | --- | --- | --- | --- |
| | | 200° C. | 300° C. | 400° C. | 500° C. | 600° C. | 700° C. | 800° C. |
| PIB-1-S | Air | 100 | 98 | 94 | 89 | 67 | 0 | 0 |
| PIB-1F-S | Air | 100 | 99 | 95 | 92 | 73 | 0 | 0 |
| PIB-4-S | Air | 100 | 100 | 97 | 89 | 70 | 12 | 0 |
| PIB-8-S | Air | 100 | 100 | 97 | 93 | 78 | 0 | 0 |
| PIB-9-S | Air | 100 | 98 | 92 | 89 | 70 | 0 | 0 |
| PIB-11-S | Air | 100 | 100 | 99+ | 99 | 76 | 0 | 0 |
| PIB-17-S | Air | 100 | 100 | 99 | 98 | 83 | 10 | 0 |
| PIB-19-S | Air | 100 | 100 | 98 | 97 | 82 | 13 | 0 |

F. Coating of Substrates

Solutions PIB-17-S and PIB-19-S were coated on various substrates either by applying the solution with a small camel's hair brush or by dipping, and then cured by heating the coated articles in a forced air oven at 80° C. for 20 hours, 100°–110° C. for 3 hours and then 200° C. for 20 hours. Substrates coated were stainless steel and aluminum panels, 100 pores/inch and 20 pores/inch reticulated polyurethane foam, 1.5 oz./ft.² random glass mat, copper wire #24, wood dowel (charred during cure), and asbestos board. Bubbling occurred on the surface of many of the samples prepared from PIB-17-S. Very little bubbling occurred to the coatings prepared from PIB-19-S.

EXAMPLE 8

(a) Synthesis of Propargyl-Terminated Oligomeric Polyimide (BTPA-1). Reaction of BTCA, ODA and Propargyl Amine (2:1:2).

In a m-cresol:benzene azeotropic apparatus was placed a solution of BTCA (29.001 g., 0.09 mole) in 200 ml. of m-cresol and 50 ml. of benzene. The mixture was warmed to approximately 50° C. and a solution of ODA (9.011 g., 0.045 mole) in 150 ml. of m-cresol was added, forming a slight amount of yellow precipitate. After 10 minutes, a solution of propargyl amine (5 g., 0.0908 mole) in 50 ml. of m-cresol was added and the solution heated to reflux. During 2 hours of reflux, 3.3 ml. of water was collected. After cooling, the deep red solution was concentrated on a rotary flash evaporator. A small sample was removed for analysis and approximately 5 mg. of t-butyl catechol was added to the bulk of the residue, which was vacuum-dried at 100° C. for 30 hours, and then at 150° C. for 12 hours, to give sample A, 37.850 g. (95%) as a dark-brown solid. It softened at 270° C.; partially melted between 280°–300° C., but quickly rehardened at 300° C.

Analysis: Calc'd. for $C_{52}H_{26}N_4O_{11}$: C, 70.75; H, 2.97; N, 6.35; O, 19.94. Found: C, 70.84; H, 3.13; N, 6.31; O, -----.

(b) Polymerization of BTPA-1.

A sample of BTPA-1 was mixed with about 5% by weight of $Cu_2Cl_2$ (cuprous chloride) and spread on a hot plate preheated to the melting point of the BTPA-1. The sample was open to air. An infusible, insoluble polymer was obtained due to the oxygen coupling of the acetylene terminal groups.

EXAMPLE 9

(a) Preparation of Phenolic-Terminated Oligomeric Polyimide (BTAP-1). Reaction of BTCA, ODA and p-Aminophenol (2:1:2).

In the m-cresol:benzene azeotropic apparatus was placed a solution of BTCA (3.222 g., 0.01 mole) in 25 ml. of m-cresol and 15 ml. of benzene. After warming to 50° C., a solution of ODA (1.001 g., 0.005 mole) in 15 ml. of m-cresol was added, forming an immediate yellow precipitate. Further heating did not dissolve the precipitate, and, after 10 minutes, a slurry of freshly purified p-aminophenol (m.p. 190°–193° C.; 1.019 g., 0.01 mole) in 10 ml. of m-cresol was added. At reflux, the solid dissolved forming an orange solution. During 2 hours of reflux, 0.20 ml. of water was collected and a precipitate formed. Then, the solvents were removed on a rotary flash evaporator and the residue was vacuum-dried at 170° C., yielding a yellow solid, 4.907 g. (99%). Its infrared spectrum was consistent with the structure expected for the compound. It softened slightly at 50° C., was almost completely melted at 265°–280° C.; and rehardened at 283° C. It was soluble in hot m-cresol, hot DMAC and hot sulfolane.

Analysis: Calc'd. for $C_{58}H_{30}N_4O_{13}$: C, 70.30; H, 3.05; N, 5.65; O, 20.99. Found: C, 70.04; H, 3.01; N, 5.73; O, -----.

(b) Polymerization of BTAP-1.

A mixture of BTAP-1 with about 10–12% paraformaldehyde and 1–5% lime cures into an insoluble, intractable polymer when heated at the melting point of BTAP-1 on a hot plate.

EXAMPLE 10

(a) Preparation of Phenol-Terminated Oligomeric Polyimide (BTAP-4). Reaction of BTCA, SDA-3,3 and p-Aminophenol (5:4:2).

According to the m-cresol:benzene technique there was allowed to react BTCA (6.4446 g., 0.02 mole), SDA-3,3 (3.9730 g., 0.016 mole) and p-aminophenol (0.8730 g., 0.008 mole). There was obtained 10.0418 g. (95%) of a pale yellow powder (BTAP-4) which was soluble in m-cresol, DMAC and sulfolane. In hot dioxane BTAP-4 formed a separate oily layer. On a Fisher-Johns melting point apparatus BTAP-4 softened at 210° C., melted at 240°–260° C. and did not harden on being heated at 300° C. for 40 minutes. The lowest temperature at which a sample would melt completely when dropped onto the preheated stage was 250° C.

Analysis: Calc'd. for $C_{145}H_{72}N_{10}O_{35}S_4$: C, 65.90; H, 2.75; N, 5.30; O, 21.19; S, 4.85. Found: C, 65.45; H, 2.88; N, 4.99; O, -----; S, ----. C, 65.43; H, 2.95; N, 5.31; O, -----; S, ----.

(b) Polymerization of BTAP-4.

A mixture of BTAP-4 with about 10–12% paraformaldehyde and 1–5% lime cures into an insoluble, intractable polymer when heated at the melting point of BTAP-4 on a hot plate.

(c) Preparation of Aldehyde-Terminated Oligomer.

When an equivalent molar quantity of p-aminobenzaldehyde, $NH_2C_6H_4CHO$ (0.968 g.) is used instead of the p-aminophenol of (a) of this Example, the corresponding aldehyde-terminated oligomeric imide is obtained.

Similarly, when an equivalent molar amount of p-aminobenzylidene-aniline, $NH_2C_6H_4CH=NC_6H_5$ (1.568 g.) is used instead of the p-aminophenol of (a) of this Example, the corresponding Schiff base-terminated oligomer is obtained. The amino-aryl Schiff bases were readily prepared by the procedure give by Rossi in Gazz. chim., Ital., 44, 263 (1966).

(d) Coupling of Schiff Base-Terminated Oligomer.

The Schiff base-terminated oligomers as in (c) of this Example couple similarly to the nitrile terminated oligomers of Example 6. They couple readily when heated in the range of 200°–300° C. for 30 minutes to 2 hours, depending on the nature of the oligomer and of the Schiff base termini. The coupling reaction is accelerated markedly by the addition of catalytic quantities of Lewis acid salts, from about 0.15 to about 3 weight percent, such as $AlCl_3$, $SbCl_3$, $SbCl_5$ or any of the numerous Lewis acid salts well-known as alkylation, isomerization or polymerization catalysts. For reasons of economy and relative ease of handling, zinc chloride, zinc sulfate, and the copper salts are preferred as coupling catalysts for the Schiff base-terminated oligomeric polyimides.

EXAMPLES 11–56

A. Preparation of Imide Oligomers (a) Preparation of Aromatic Nitrile-Terminated Oligomeric Polyimide (BTAN-2). Reaction of 3,3',4,4'-Benzophenone-tetracarboxylic Acid Dianhydride (BTCA), 4,4'-Oxydianiline (ODA) and 4-Aminobenzonitrile (AN) (2:1:1).

In the m-cresol:benzene azeotropic apparatus there was placed a solution of 3,3',4,4'-benzophenonetetracarboxylic acid dianhydride (BTCA) (3.222 g., 0.01 mole) in 25 ml. m-cresol and 15 ml. benzene. The mixture was warmed to approximately 50° C. and a solution of 4,4'-oxydianiline (ODA) (1.001 g., 0.005 mole) in 15 ml. of m-cresol was added, giving an immediate yellow precipitate. After 15 minutes, a solution of 4-aminobenzonitrile (AN) (1.299 g., 0.011 mole) in 10 ml. of m-cresol was added. During 2 hours of refluxing, the solution became orange and 0.25 ml of water was collected. Precipitation did not occur. After cooling, the solvents were removed on a rotary flash evaporator and the residue was vacuum-dried at 100° C. to yield 5.177 g. (102%) of phenylnitrile-terminated oligomeric polyimide based on BTCA (BTAN-2). On a Fisher-Johns melting point apparatus, 230° C. was the lowest temperature at which it softened before rehardening immediately. It was soluble in hot m-cresol, slightly soluble in hot dimethyl acetamide (DMAC), and insoluble in hot acetone. A sample of BTAN-2 was postheated in nitrogen at 300° C. for 24 hours, and its TGA in nitrogen of sample BTAN-2-H300, showed an inflection point at 410° C.

Analysis: Calc'd. for $C_{60}H_{28}N_6O_{11}$: C, 71.43; H, 2.80; N, 8.03; O, 17.44 Found: C, 70.83; H, 2.81; N, 7.77; O, -----. Found: C, 71.22; H, 2.86; N, 7.93; O, ----- (dried at 140° C.)

(b) Preparation of Aromatic Nitrile-Terminated Oligomeric Polyimide (BTAN-3). Reaction of BTCA, 3,3'-Sulfonyldianiline (SDA-3,3) and AN (9:8:2).

In the m-cresol:benzene azeotropic apparatus there was placed a solution of BTCA; (2.1750 g., 0.00675 mole) in 25 ml. of m-cresol and 10 ml. of benzene. The solution was warmed to approximately 70° C. and a solution of AN (0.1773 g., 0.0015 mole) in 10 ml of m-cresol was added over about 20 minutes. After stirring at approximately 70° C. for 15 minutes, a solution of 3,3'-sulfonyldianiline (SDA-3,3) (1.4899 g., 0.0060 mole) in 15 ml. of m-cresol was added and the solution was heated to reflux for 3 hours, during which time, 0.3 ml. of water was collected; then the benzene was distilled off and after cooling to room temperature, the solution was added dropwise slowly to 200 ml. of well-stirred methanol, to yield a light-yellow solid. The solid was filtered off, digested four times in hot methanol, and dried at 40° C. for 24 hours, to give 3.40 g. (95%) of yellow product. The yield, corrected for about 2% retained m-cresol, was 93.5%. The oligomer partially melted at 255° C. and rehardened at 275° C.; it was soluble in m-cresol, DMAC and hot sulfolane, but insoluble in dioxane. A small sample, vacuum-dried at 200° C. for 4 hours, showed a 2% loss of m-cresol, which was confirmed in its TGA in nitrogen, which also shows an inflection point in nitrogen in the 500° C. region. Its DTA in nitrogen shows an endotherm at 225° C.

Analysis: Calc'd. for $C_{263}H_{126}N_{20}O_{61}S_8$: C, 65.83; H, 2.65; N, 5.84; O, 20.34; S, 5.35. Found: C, 65.29; H, 2.70; N, 5.36; O, -----; S, ----.

The above procedure was repeated except that the quantities used were increased to yield 33.0 g. (97%) of BTAN-3. The quantities used were BTCA, 21.7505 g., 0.0675 mole; SDA-3,3, 14.899 g., 0.060 mole; AN, 1.7172 g., 0.0150 mole.

(c) Preparation of Aromatic Nitrile-Terminated Oligomeric Polyimide (BTAN-4). Reaction of BTCA, 1,3-Di(3-Aminophenoxy)benzene (DAPB-3,3) and AN (9:8:2).

In the m-cresol:benzene azeotropic apparatus there was placed a solution of BTCA (2.1753 g., 0.00675 mole) in 25 ml. of m-cresol and 10 ml of benzene. The solution was warmed to approximately 70° C. and a solution of AN (0.1773 g. 0.0015 mole) in 10 ml. of m-cresol was added over about 20 minutes. After stirring for another 15 minutes, a solution of 1,3-di(3-aminophenoxy)benzene (DAPB-3,3) (1.7540 g., 0.0060 mole) in 15 ml of m-cresol was added. The solution was heated to reflux for 3 hours and 0.2 ml of water was collected. Then the benzene was distilled off. After cooling, the clear solution was added dropwise to 200 ml of methanol. The precipitated solid was digested three times in hot methanol and vacuum-dried at 70° C. to give BTAN-4, as a light-yellow solid, 3.4 g. (88%).

The infrared spectrum (KBr disc) of BTAN-4 is given in FIG. 29; it was soluble in m-cresol, DMAC, sulfolane, dioxane; because a paste in methylene chlordie, swelled in chloroform and was insoluble in acetonitrile. BTAN-4 softened at 180° C., melted over the range of 197°–218° C., thickened above 290° C., but did not harden within 20 minutes at 300° C., although it did darken somewhat. For the sample dried at 70° C., the DTA in nitrogen showed a melting endotherm at about 180° C.

A sample of BTAN-4, vacuum-dried at 200° C., to eliminate volatiles, was submitted for analysis.

Analysis: Calc'd. for $C_{305}H_{158}N_{20}O_{61}$: C, 72.13; H, 3.14; N, 5.52; O, 19.22. Found: C, 72.41; H, 3.28; N, 5.11; O, -----.

(d) Synthesis of Allyl-Terminated Oligomeric Polyimide (BTAA-3). Reaction of BTCA, ODA and Allylamine (2:1:2).

In the m-cresol:benzene azeotropic apparatus, there was placed a solution of BTCA (3.222 g., 0.01 mole) in 25 ml. of m-cresol and 15 ml. of benzene. The solution was warmed to approximately 60° C. and a solution of ODA (1.001 g., 0.005 mole) in 15 ml. of m-cresol was added, forming an immediate yellow precipitate which dissolved on heating further for 5 minutes. Then, a solution of allylamine (0.629 g., 0.011 mole) in 10 ml of m-cresol was added, after which the solution was heated to reflux; during 2 hours of reflux 0.25 ml. of water was collected. After cooling, the solution was made up to 80 ml. with added benzene, and it was divided into two 40-ml. portions.

The first 40-ml. fraction was added to 250 ml. of methanol and then stirred for 1 hour. This solid material was isolated by centrifuging and dried in a vacuum oven at 80° C. for 36 hours, yielding a yellow solid (A), 1.87 g. (84%).

The second 40-ml. fraction was evaporated on a rotary flash evaporator and the residue was dried in a vacuum oven at 80° C., yielding a yellow solid (B), 2.306 g. (104%). Sample B softened at 130° C., was nearly completely molten at 200°–300° C., darkened in 10 minutes at 230° C., was soluble in hot m-cresol, slightly soluble in hot DMAC, and insoluble in acetone.

Analysis: Calc'd. for $C_{52}H_{30}N_4O_{11}$: C, 70.42; H, 3.41; N, 6.32; O, 19.85. Found: C, 70.99; H, 3.79; N, 6.47; O, -----.

A sample of BTAA-3B was postheated in nitrogen at 300° C. for 24 hours, and its TGA in nitrogen, at 10° C./minute, showed an inflection point at 360° C.

(e) Preparation of Aliphatic Nitrile-Terminated Oligomeric Polyimide (BTBN-1). Reaction of BTCA, ODA and 4-Aminobenzyl Cyanide (BN) (2:1:2).

In the m-cresol:benzene azeotropic apparatus was placed a solution of BTCA (3.222 g., 0.01 mole) in 25 ml. m-cresol and 15 ml. of benzene. The mixture was warmed to approximately 50° C. and a solution of ODA (1.001 g., 0.005 mole) in 15 ml. of m-cresol was added, giving an immediate yellow precipitate. After refluxing for 15 minutes, a solution of aminobenzyl cyanide (BN) (1.454 g., 0.011 mole) in 10 ml. of m-cresol was added. The precipitate dissolved quickly. During 1½ hours of reflux, 0.30 ml. of water was collected and a precipitate formed. Then sodium acetate (0.041 g., 0.0005 mole) was added and reflux was continued for another hour, and another 0.05 ml. of water was collected. After cooling, the solvents were removed on a rotary flash evaporator and the residue was dried in a vacuum oven at 100° C., the yield was 5.170 g. (~100%). Its infrared spectrum was consistent with the expected structure. Benzylcyanide-terminated oligomeric polyimide based on BTCA (BTBN-1) softened at 200° C., was almost completely melted by 290° C. and rehardened rapidly at 300° C. Also, it was soluble in hot m-cresol, slightly soluble in hot DMAC, and insoluble in acetone. A sample dried at 300° C. was also submitted for analysis.

Analysis: Calc'd. for $C_{62}H_{32}N_6O_{11}$: C, 71.81; H, 3.11; N, 8.11; O, 16.97. Found (B): C, 70.28; H, 3.22; N, 8.12; O, -----. (dried at 300° C.)

The TGA in nitrogen on the sample dried at 300° C. showed an inflection point of 360° C.

(f) Preparation of Aliphatic Nitrile-Terminated Oligomeric Polyimide (BTBN-3). Reaction of BTCA, SDA-3,3 and BN (9:8:2).

According to the azeotropic procedure used in (b) above, BTCA (2.1752 g., 0.00675 mole), BN (0.1982 g., 0.0015 mole) and SDA-3,3 (1.4898 g., 0.0060 mole) were allowed to react. There was obtained 3.27 g. (91%) of a light-yellow solid (BTBN-3). The yield, corrected for approximately 1% retained m-cresol, was 89%.

The oligomer melted at 250°-26-°C., and rehardened at 290° C. It was soluble in m-cresol, DMAC and hot sulfonlane but insoluble in dioxane.

A small portion, vacuum-dried at 200° C. for 4 hours showed a 1% loss of retained m-cresol, which was confirmed in its TGA in nitrogen which also showed an inflection point in the 500° C. region.

The above procedure was repeated except that the quantities used were such as to yield a larger amount of product: BTCA, 21.750 g., 0.0675 mole; SDA-3,3, 14.899 g., 0.060 mole; BN, 1.982 g., 0.0150 mole. The BTBN-3 obtained from this reaction amounted to 34.8 g. (96%).

Analysis: Calc'd. for $C_{265}H_{130}N_{20}O_{61}S_8$: C, 65.94; H, 2.72; N, 5.80; O, 20.22; S, 5.32. Found: C, 65.18; H, 2.65; N, 5.71; O, -----; S, ----.

(g) Preparation of Aliphatic Nitrile-Terminated Oligomeric Polyimide (BTBN-4). Reaction of BTCA, DAPB-3,3 and BN (9:8:2).

According to the procedure used in (c) above to prepare BTAN-4, BTCA (2.1753 g., 0.00675 mole), BN (0.1982 g., 0.0015 mole) and DAPB-3,3 (1.7540 g., 0.0060 mole) were allowed to react to afford, after vacuum-drying at 70° C., BTBN-4, 3.8 g. (97%) as a light-yellow solid. BTBN-4 was soluble in m-cresol, DMAC, sulfolane and dioxane. It was partially soluble in hot chloroform and hot methylene chloride, and was insoluble in acetonitrile.

On a Fisher-Johns melting point apparatus, BTBN-4 softened at 135° C., melted at 196°-215° C., thickened above 235° C. and remelted at 255° C. It did not reharden when held for ½ hour at 300° C. A sample of BTBN-4, vacuum-dried at 200° C., was submitted for analysis.

Analysis: Calc'd. for $C_{307}H_{162}N_{20}O_{61}$: C, 72.20; H, 3.20; N, 5.49; O, 19.11. Found: C, 72.21; H, 3.15; N, 5.44; O, -----.

(h) Preparation of Styrene-Terminated Oligomeric Polyimide (BTAS-1). Reaction of BTCA, ODA and m-Aminostyrene (AS) (2:1:2).

In the m-cresol:benzene azeotropic apparatus was placed a solution of BTCA (3.222 g., 0.01 mole) in 25 ml. of m-cresol and 10 ml. of benzene. After warming to approximately 70° C., a solution of ODA (1.001 g., 0.005 mole) in 15 ml. of m-cresol containing 2 mg. of t-butyl catechol was added, forming an immediate yellow precipitate. After heating for 15 minutes, a solution of m-aminostyrene (AS) (1.192 g., 0.01 mole, Sapon Laboratories) in 10 ml. of m-cresol was added and the solution was heated to reflux, forming a homogeneous solution. After 1 hour of reflux, a precipitate began to form. After 2 hours of reflux, during which 0.25 ml. of water was collected, the reaction mixture was cooled and poured into 250 ml. of methanol. After stirring for several hours, the solid material was filtered off, washed with methanol and vacuum-dried at 40° C. for 18 hours. The sample still had a distinct odor of m-cresol. A small portion was removed and vacuum-dried at 200° C. for 24 hours to give fraction A whose infrared spectrum was recorded. The remainder of the material was finely divided and stirred with 50 ml. of ether, and dried at 40° C. to afford 4.0402 g. (80%) of a yellow powder, fraction B. The infrared spectrum of sample A was substantially the same as that of sample B.

Sample A softened at 220° C.; was partially molten at 250° C. when pressure was applied; was almost completely molten at 300° C. when pressure was applied; and rehardened (cured) to a granular solid after 25 minutes at 300° C. Sample A was slightly soluble in hot m-cresol.

Sample B softened at 70° C.; was nearly completely molten at 225° C. with applied pressure; and hardened (cured) to a granular solid at 250° C. Sample B was soluble in hot m-cresol, and virtually insoluble in sulfolane, DMAC and toluene.

Analysis: Calc'd. for $C_{62}H_{34}N_4O_{11}$: C, 73.66; H, 3.39; N, 5.54; O, 17.41. For A Found: C, 73.21; H, 3.67; N, 5.79; O, -----.

A portion of sample B was postheated in nitrogen at 300° C. for 24 hours, and a TGA performed in nitrogen at 10° C./minute, showed an inflection point of 410° C.

(i) Preparation of Styrene-Terminated Oligomeric Polyimide (BTAS-3). Reaction of BTCA, DAPB-3,3 and AS (8:7:2).

In the m-cresol:benzene azeotropic apparatus fitted with provisions for a nitrogen sweep, was placed a warm solution of BTCA (1.2889 g., 0.004 mole) in 25 ml. of m-cresol and 10 ml. of benzene containing 1-2 mg. of t-butyl catechol. Then a solution of AS (1.1192 g., 0.01 mole) in 5 ml. of m-cresol was added and the solution was then stirred and heated at approximately 70° C. for 15 minutes. Then a solution of DAPB-3,3 (1.023 g., 0.0035 mole) in 10 ml. of m-cresol was added and the solution heated to reflux which was maintained for 4 hours, during which time, approximately 1.5 ml. of water was collected. Then the benzene was distilled off. After cooling to ambient temperature, the slightly hazy solution was added dropwise to 150 ml. of methanol. The solid was filtered off and washed three times in 30 ml. of boiling methanol, which contained a trace of t-butyl catechol, for 15 minutes each time, then it was given a final wash with inhibitor-free boiling methanol. The yellow solid was filtered and vacuum-dried at room temperature for two days to give BTAS-3, 1.782 g. (78%) as a yellow solid. Its TGA in nitrogen at 10° C./minute showed the retention of m-cresol solvent.

On a Fisher-Johns melting point block, it melted at 190°–195° C., hardened at 205° C., resoftened and remelted at 210°–233° C., and rehardened at 268° C. Its DTA at 20° C./minute showed a melting endotherm at 183° C. BTAS-3 was soluble in dioxane, m-cresol, DMAC and sulfolane; it swelled in tetrahydrofuran, styrene, divinylbenzene and toluene, and was insoluble in methyl ethyl ketone.

A portion of BTAS-3 was vacuum dried at 200° C. for 36 hours and analyzed.

Analyisis: Calc'd. for $C_{278}H_{146}N_{16}O_{54}$: C, 72.99; H, 3.22; N, 4.90; O, 18.89. Found: C, 73.55; H, 3.31; N, 5.03; O, -----.

(j) This oligomer (BTAS-4) is prepared in Example 3 above.

(k) Preparation of Styrene-Terminated Oligomeric Polyimide (BTAS-10R). Reaction of BTCA, 4,4'-Methylenedianiline (MDA-4,4) and AS (9:8:2).

In the m-cresol:benzene azeotropic apparatus equipped with a nitrogen inlet and outlet, there was placed BTCA (21.7505 g., 0.0675 mole) in 80 ml. of m-cresol and 40 ml. of benzene. The temperature of the mixture was raised to approximately 70° C. as nitrogen was passed through the apparatus, and a solution of m-aminostyrene (AS) (1.7874 g., 0.015 mole) in 40 ml. of m-cresol containing 0.1 g. of t-butyl catechol was added over 15 minutes, and the solution was stirred for an additional 15 minutes. Then a solution of 4,4'-methylenedianiline (MDA-4,4) (11.8956 g., 0.060 mole) in 55 ml. of m-cresol was added and the solution was brought to reflux. After refluxing for 3 hours, during which 2.35 ml. of water was collected, a copious yellow precipitate was present. Then, the benzene was distilled off and the reaction solution was added dropwise to methanol. The precipitated oligomer was digested three times in hot methanol containing approximately 0.1 g. of t-butyl catechol and then vacuum-dried at ambient temperature for 63 hours to afford BTAS-10R, 32.565 g. (98.7%), whose infrared spectrum was consistent with that expected for the compound.

A 2.25 g. sample of BTAS-10R was washed once with methanol to remove the inhibitor to afford 2.190 g. of inhibitor-free BTAS-10, whose DTA in air showed a slight endotherm at 150° C., followed by an exotherm at 175° C.

Analysis: Calc'd. for $C_{273}H_{148}N_{10}O_{45}$: C, 74.52; H, 3.39; N, 5.73; O, 16.36 Found: C, 73.38; H, 3.52; N, 5.84; O, 16.59.

(l) Preparation of Styrene-Terminated Oligomeric Polyimide (BTAS-11). Reaction of BTCA, 1,3-Di(4-Aminophenoxy)benzene (DAPB-3,4) and AS (9:8:2).

By the procedure used in the preparation of (k) above, there was reacted BTCA (1.8126 g., 0.00563 mole) in 25 ml of m-cresol and 20 ml of benzene, a solution of AS (0.14909 g., 0.00125 mole) in 10 ml. of m-cresol containing 0.1 g. t-butyl catechol, and s solution of 1,3-di(4-aminophenoxy)benzene (DAPB-3,4) (1.4617 g., 0.005 mole) in 20 ml. of m-cresol. After refluxing for 5 hours, there was obtained 0.35 ml. of water and solution had not occurred. Then the benzene was distilled off and the reaction mixture was slowly poured into methanol to precipitate the oligomer. The oligomer was digested thred times in hot methanol containing 0.1 g. t-butyl catechol and vacuum-dried at 40° C. to give 3.4882 g. (96.8%) of BTAS-11 as a yellow powder. A small portion of BTAS-11 was digested again in hot methanol to remove the inhibitor for use in testing. Its infrared spectrum was consistent with that expected for the compound.

The TGA in air showed the retention of about 3% m-cresol and an inflection point in the 500° C. region.

Analysis: Calc'd. for $C_{313}H_{164}N_{18}O_{61}$: C, 72.96; H, 3.21; N, 4.89; O, 18.94. Found: C, 72.22; H, 3.11; N, 4.69; O, -----.

(m) Preparation of Styrene-Terminated Oligomeric Polyimide (BTAS-1). Reaction of 1,4,5,8-Naphthalenetetracarboxylic Acid Dianhydride (NTCA), DAPB-3,3 and AS (9:8:2).

According to the procedure given for (1) above, there was allowed to react 1,4,5,8-naphthalenetetracarboxylic acid dianhydride (NTCA) (2.8369 g., 0.01125 mole), DAPB-3,3 (2.9233 g., 0.01 mole) and AS (0.2979 g., 0.0025 mole). There was obtained NTAS-1 as a tan powder which partially melted, with darkening at 220°–260° C., rehardened at 265° C., and then did not change up to 300° C. When a sample was placed on a Fisher-Johns apparatus at approximately 220° C., it became completely molten by 260° C. and rehardened at about 265° C.

NTAS-1 was soluble in DMAC, m-cresol, sulfolane and concentrated sulfuric acid, and swelled in hot dioxane. Its infrared spectrum was consistent with that expected for the compound.

Analysis: Calc'd. for $C_{286}H_{146}N_{18}O_{52}$: C, 73.61; H, 3.15; N, 5.40; O, 17.83. Found: C, 73.74; H, 3.50; N, 5.83; O, -----.

(n) Preparation of Styrene-Terminated Oligomeric Polyimide (PMAS-1). Reaction of Pyromellitic Anhydride (PMA), DAPB-3,3 and AS (9:8:2).

According to the procedure given for (1) above, there was allowed to react pyromellitic anhydride (PMA) (2.4538 g., 0.01125 mole), DAPB-3,3 (2.9233 g., 0.01 mole) and AS (0.2979 g., 0.0025 mole). Complete solution did not occur during the reaction period. There was obtained PMAS-1, which melted at 150°–210° C., rehardened at 240° C., and resoftened at 275° C., and rehardened after 20 minutes at 300° C. PMAS-1 swelled in m-cresol, and was insoluble in concentrated sulfuric acid, hot DMAC, sulfolane and dioxane. Its infrared spectrum was consistent with that expected for the compound. Its DTA in air and its TGA in air showed solvent retention and an inflection point in the 500° C. region.

Analysis: Calc'd. for $C_{250}H_{128}N_{18}O_{52}$: C, 71.22; H, 3.06; N, 5.98; O, 19.74. Found: C, 71.22; H, 3.22; N, 6.17; O.

B. Dipolar Cycloaddition Reactions

In Examples 11–56, three procedures, A to C inclusive, were used to prepare cycloaddition reaction products of some dipolarophilic-terminated oligomeric polyimides prepared in (a) to (n) of Part A of this Example with the two dipoles 1,4-benzenedinitrile oxide (BDNO) and 1,4-benzenedi(phenylnitrilimine)-(BDNI). However, basically, the three procedures are equivalent. Minor modifications were introduced to accommodate the particular systems used. For example, in some cases a highly soluble oligomer required less solvent in which to perform the reaction.

Procedure A: The acceptor was first dissolved in 18 ml. of m-cresol, by warming if necessary. The solid dipole was added and the mixture was stirred at ambient temperature until solution was effected. The solution was then placed in an air oven at 70°–80° C. for 5 to 8 days, after which the temperature was raised to 200° C. for 1 day. Finally, the samples were vacuum-dried at 200° C. for 1 day, and the weight recorded. Small samples were dried in an air oven at 200° C., 240° C. or 300° C. for 24 hours and the temperature at which they were cured designated by the suffix, H200, H240 and H300 after the polymer number.

Procedure B: The acceptor was first dissolved in 5–10 ml. of m-cresol, by warming if necessary. Then solid dipole was added and the mixture was stirred at ambient temperature until solution occurred, after which the solution was then placed in an air oven at 100° C. for 24 hours, and then at 200° C. for 48 hours. The residues were then vacuum-dried at 200° C. for 24 hours and the weights recorded. Small samples were dried in an air oven at 300° C. for 24 hours and are designated as H300.

Procedure C: This procedure is a modification of Procedure B in that, after mixing, the samples were allowed to stand at ambient temperature for 48 hours and then were heated to 200° C. over an 8-hour period. After drying in an air oven at 200° C. for 48 hours, the residues were vacuum-dried at 200° C. for 24 hours and the weights were recorded.

BDNI and BDNO were prepared as follows:

Synthesis of 1,4-Benzenedi(phenylnitrilimine)
p-C₆H₄(C=NNC₆H₅)₂, BDNI

1. Intermediate Terephthaloylphenylhydrazide Chloride,

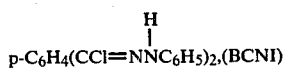

p-C₆H₄(CCl=NNC₆H₅)₂,(BCNI)

A mixture of 5.8 g. (0.016 mole) of terephthaloylphenylhydrazide, (m.p. 265° C.), 7.5 g. (0.036 mole) phosphorous pentachloride in 60 ml. anhydrous ether was heated under reflux for twenty-four hours during which time the mixture remained heterogeneous. Then 20 g. phenol (0.212 mole) in 20 ml. ether was added to the mixture, followed by the slow addition of 30 ml. (0.74 mole) of methanol and allowed to cool to room temperature. The yellow crystals which formed were separated by the filtration. The filtrate was concentrated at 50° C. until more crystals appeared; these were isolated by filtration. The crude product was recrystallized from benzene, yielding 2.14 g. (35.0%); m.p., 216°–217° C. Its infrared spectrum showed the C=N absorption at 6.3μ; the amide peak,

at 5.9μ was not present.

Analysis: Calc'd. for $C_{20}H_{16}Cl_2N_4$: C, 62.66; H, 4.20; N, 14.62; Cl, 18.52. Found: C, 62.92; H, 4.32; N, 14.49; Cl, 18.30.

2. Synthesis of BDNI from BCNI

To 0.2 g. of BCNI in 2 ml. DMAC there was added 0.12 g. Et₃N and the mixture allowed to react with stirring at room temperature for two hours. Then 5 ml. of water was added and the resulting precipitate removed by filtration, washed with distilled water and dried in a vacuum oven at 30° C.; yield of brown powder, 0.152 g. (~100%); m.p. 180°–185° C. (with resinification).

BDNI is used within 72 hours after its preparation.

Synthesis of 1,4-Benzenedinitrile Oxide BDNO

1. Intermediate Terephthaldehyde Dioxime, p-C₆H₄(CH=NOH)₂

Into a 2-liter Erlenmeyer flask were place 45 g. (0.66 mole of hydroxylamine.HCl dissolved in 237 ml. of water and 26.4 g. (0.66 mole) of sodium hydroxide dissolved in 150 ml. of water; this mixture was thoroughly agitated. Then 40.2 g. (0.3 mole) of terephthaldehyde, dissolved in 300 ml. of ethanol was added to the mixture, which remained clear for a few seconds, then a large amount of white precipitate formed. The mixture was brought to reflux on a steam bath, then 200 ml. of 95% ethanol was added to dissolve the precipitate, and reflux was continued for 30 minutes, after which the mixture was cooled in an ice-water bath, and the white crystals which precipitated were recovered by filtration. The crude dioxime was recrystallized from a 55% ethanol 45% water solution. The yield of recrystallized product was 95% based on terephthaldehyde; m.p. 220°–222° C. Its infrared spectrum showed bands for >C=N— at 6.14 and 6.6μ; for —OH absorption at 3.3, 7.1 and 7.6μ; and for

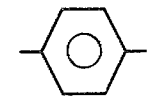

at 8.2 and 12.0μ.

2. Intermediate Terephthalhydroxamoyl Chloride,

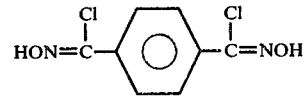

Into a suspension of 2.3 g. terephthaldehyde dioxime (A above) in 45 ml. CCl₄ was passed slowly with stirring a stream of Cl₂ gas for a period of 1.5 hours. The temperature of the reaction mixture was held below 0° C. by means of an ice-salt cooling bath, then the mixture was allowed to remain at room temperature overnight. The suspended solids were recovered from CCl₄ by filtration and were recrystallized twice from 10% ethanol-90% chloroform. White crystals were obtained, m.p. 184°–186° C.

3. Synthesis of 1,4-Benzenedinitrile Oxide (BDNO)

A solution of 16.7 g. (0.0716 mole) of terephthalhydroxamoyl chloride in 270 ml. of diethyl ether was added over a period of 15 minutes to a well stirred solution of 21 g. of triethylamine (0.21 mole) in 760 ml. of diethyl ether; the reaction was maintained at 0°–2° C. with a salt-ice cooling bath. A voluminous precipitate was formed and after stirring for 10 minutes, 60 ml. of ice-water was added to the reaction mixture and stirring continued for an additional 30 minutes. Then the precipitate was recovered by filtration, washed thoroughly 3 times with alternate portions of cold water and diethyl ether, and then dried at room temperature at 5 mm. Hg pressure for 18 hours. Yield 80% of theory (9.3 g.) as a yellow powder which does not melt at temperatures up to 300° C. The infrared spectrum showed the strong bands characteristic of the nitrile oxides at 4.3, 8.5 and 9.2μ.

Analysis: Calc'd. for $C_8H_4O_2N_2$: C, 60.00; H, 2.52; N, 17.50. Found: C, 59.90; H, 2.58; N, 17.37.

Table VI, below, summarized the data on the polymers so prepared.

Table VI.

Data on Dipolar Cycloaddition Reactions of Various Oligomeric Polyimides

| Example No. | Pro-cedure | Oligomer (Ol) | Grams | Dipole (Di) | Grams | Molar Ratio Ol:Di | % Yield | Cured at °C | Atmosphere | TGA Break °C | Inflection Point °C |
|---|---|---|---|---|---|---|---|---|---|---|---|
| 11 | A | BTAS-1 (h) | 0.505 | BDNO | 0.0190 | 1:1 | 100 | 200 | nitrogen | 320 | (320) |
|  |  |  |  |  |  |  |  | 240 | nitrogen | 360 | (520) |
| 12 | A | BTAS-1 (h) | 0.505 | BDNI | 0.105 | 1:1 | 107 | 240 | nitrogen | 300 | (350) |
|  |  |  |  |  |  |  |  | 300 | nitrogen | 340 | (510) |
| 13 | B | BTAS-3 (i) | 0.4478 | BDNO | 0.016 | 1:1 | 100 | 200 | air | 270 | 560 |
|  |  |  |  |  |  |  |  | 300 | air | 380 | 580 |
| 14 | B | BTAS-4 (j) | 0.4882 | BDNO | 0.0640 | 1:4 | 110 | 200 | nitrogen | 380 | 510 |
|  |  |  |  |  |  |  |  | 200 | air | 380 | 490 |
| 15 | B | BTAS-4 (j) | 0.4882 | BDNO | 0.0160 | 1:1 | 108 | 200 | nitrogen | 425 | 530 |
|  |  |  |  |  |  |  |  | 200 | air | 400 | 530 |
| 16 | B | BTAS-4 (j) | 0.4882 | BDNO | 0.0120 | 4:3 | 104 | 200 | nitrogen | 435 | 530 |
|  |  |  |  |  |  |  |  | 200 | air | 375 | 515 |
| 17 | C | BTAS-4 (j) | 0.4882 | BDNO | 0.0160 | 1:1 | 99.5 | 200 | air | 300 | 550 |
|  |  |  |  |  |  |  |  | 300 | air | 375 | 540 |
| 18 | B | BTAS-4 (j) | 0.4882 | BDNI | 0.0310 | 1:1 | 102 | 200 | air | 250 | 550 |
|  |  |  |  |  |  |  |  | 300 | air | 400 | 550 |
| 19 | C | BTAS-4 (j) | 0.4882 | BDNI | 0.0310 | 1:1 | 112 | 200 | air | 300 | 530 |
|  |  |  |  |  |  |  |  | 300 | air | 360 | 520 |
| 20 | B | BTAS-4 (j) | 0.4882 | BDNI | 0.0232 | 4:3 | 104 | 200 | air | 300 | 540 |
|  |  |  |  |  |  |  |  | 300 | air | 400 | 540 |
| 21 | B | BTAS-10 (k) | 0.440 | BDNO | 0.0160 | 1:1 | 92.98 | 200 | air | 390 | 560 |
| 22 | B | BTAS-10 (k) | 0.440 | BDNO | 0.0120 | 4:3 | 101.26 | 200 | air | 380 | 550 |
| 23 | B | BTAS-10 (k) | 0.440 | BDNI | 0.0310 | 1:1 | 101.57 | 200 | air | 390 | 530 |
| 24 | B | BTAS-10 (k) | 0.220 | BDNI | 0.0116 | 4:3 | 108.18 | 200 | air | 310 | 550 |
| 25 | B | BTAS-11 (l) | 0.2576 | BDNO | 0.008 | 1:1 | 104 | 200 | air | 330 | 555 |
|  |  |  |  |  |  |  |  | 300 | air | 390 | 580 |
| 26 | B | BTAS-11 (l) | 0.2576 | BDNO | 0.006 | 4:3 | 103 | 200 | air | 330 | 555 |
|  |  |  |  |  |  |  |  | 300 | air | 410 | 585 |
| 27 | B | NTAS-1 (m) | 0.4666 | BDNO | 0.016 | 1:1 | 110 | 200 | air | 350 | 510 |
|  |  |  |  |  |  |  |  | 300 | air | 350 | 525 |
| 28 | B | NTAS-1 (m) | 0.4666 | BDNO | 0.012 | 4:3 | 109 | 200 | air | 350 | 505 |
|  |  |  |  |  |  |  |  | 300 | air | 400 | 525 |
| 29 | B | PMAS-1 (n) | 0.4216 | BDNO | 0.016 | 1:1 | 98 | 200 | air | 300 | 515 |
|  |  |  |  |  |  |  |  | 300 | air | 380 | 530 |
| 30 | B | PMAS-1 (n) | 0.4216 | BDNO | 0.016 | 4:3 | 99 | 200 | air | 310 | 570 |
|  |  |  |  |  |  |  |  | 300 | air | 310 | 570 |
| 31 | A | BTAN-2 (a) | 0.5045 | BDNO | 0.080 | 1:1 | 98 | 200 | nitrogen | 200 | 430 |
|  |  |  |  |  |  |  |  | 300 | nitrogen | 300 | 520 |
| 32 | A | BTAN-2 (a) | 0.5045 | BDNO | 0.320 | 1:4 | 100 | 200 | nitrogen | 200 | 350 |
|  |  |  |  |  |  |  |  | 300 | nitrogen | 350 | 550 |
| 33 | A | BTAN-2 (a) | 0.5045 | BDNI | 0.105 | 1:1 | 107 | 240 | nitrogen | 250 | 400 |
|  |  |  |  |  |  |  |  | 300 | nitrogen | 330 | 525 |
| 34 | A | BTAN-2 (a) | 0.5045 | BDNI | 0.620 | 1:4 | 103 | 240 | nitrogen | 250 | 330 |
|  |  |  |  |  |  |  |  | 300 | nitrogen | 340 | 530 |
| 35 | B | BTAN-3 (b) | 0.2399 | BDNO | 0.008 | 1:1 | 103 | 200 | air | 300 | 520 |
|  |  |  |  |  |  |  |  | 300 | air | 370 | 560 |
| 36 | B | BTAN-3 (b) | 0.2399 | BDNO | 0.0320 | 1:4 | 109 | 200 | air | 300 | 560 |
|  |  |  |  |  |  |  |  | 300 | air | 360 | 550 |
| 37 | B | BTAN-3 (b) | 0.2399 | BDNI | 0.0155 | 1:1 | 102 | 200 | air | 320 | 600 |
|  |  |  |  |  |  |  |  | 300 | air | 360 | 575 |
| 38 | B | BTAN-3 (b) | 0.2399 | BDNI | 0.0620 | 1:4 | 106 | 200 | air | 320 | 585 |
|  |  |  |  |  |  |  |  | 300 | air | 360 | 570 |
| 39 | B | BTAN-4 (c) | 0.254 | BDNO | 0.008 | 1:1 | 97.06 | 300 | air | 430 | 560 |
| 40 | B | BTAN-4 (c) | 0.254 | BDNO | 0.032 | 1:4 | 111.09 | 200 | air | 360 | 580 |
| 41 | B | BTAN-4 (c) | 0.254 | BDNI | 0.0155 | 1:1 | 100.15 | 200 | air | 390 | 545 |
| 42 | B | BTAN-4 (c) | 0.254 | BDNI | 0.062 | 1:4 | 95.41 | 200 | air | 400 | 550 |
| 43 | A | BTBN-1 (e) | 0.5185 | BDNO | 0.08 | 1:1 | 100 | 200 | nitrogen | 170 | 530 |
|  |  |  |  |  |  |  |  | 300 | nitrogen | 350 | 540 |
| 44 | A | BTBN-1 (e) | 0.5185 | BDNO | 0.320 | 1:4 | 100 | 200 | nitrogen | 200 | 530 |
|  |  |  |  |  |  |  |  | 300 | nitrogen | 350 | 560 |
| 45 | A | BTBN-1 (e) | 0.5185 | BDNI | 0.155 | 1:1 | 107 | 240 | nitrogen | 280 | 550 |
|  |  |  |  |  |  |  |  | 300 | nitrogen | 340 | 550 indeter- |

Table VI.-continued
Data on Dipolar Cycloaddition Reactions of Various Oligomeric Polyimides

| Example No. | Pro-cedure | Oligomer (Ol) | Grams | Dipole (Di) | Grams | Molar Ratio Ol:Di | % Yield | TGA Cured at °C. | Atmosphere | Break °C. | Inflection Point °C. |
|---|---|---|---|---|---|---|---|---|---|---|---|
| 46 | A | BTBN-1 (e) | 0.5185 | BDNI | 0.620 | 1:4 | 108 | 240 | nitrogen | 250 | minate |
|  |  |  |  |  |  |  |  | 300 | nitrogen | 350 | 530 |
| 47 | B | BTBN-3 (f) | 0.2423 | BDNO | 0.008 | 1:1 | 105 | 200 | air | 280 | 590 |
|  |  |  |  |  |  |  |  | 300 | air | 360 | 610 |
| 48 | B | BTBN-3 (f) | 0.2423 | BDNO | 0.032 | 1:4 | 110 | 200 | air | 310 | 570 |
|  |  |  |  |  |  |  |  | 300 | air | 350 | 550 |
| 49 | B | BTBN-3 (f) | 0.2423 | BDNI | 0.0155 | 1:1 | 99 | 200 | air | 320 | 595 |
|  |  |  |  |  |  |  |  | 300 | air | 420 | 610 |
| 50 | B | BTBN-3 (f) | 0.2423 | BDNI | 0.0620 | 1:4 | 104 | 200 | air | 320 | 580 |
|  |  |  |  |  |  |  |  | 300 | air | 390 | 595 |
| 51 | B | BTBN-4 (g) | 0.255 | BDNO | 0.008 | 1:1 | 97.00 | 200 | air | 400 | 520 |
| 52 | B | BTBN-4 (g) | 0.255 | BDNO | 0.032 | 1:4 | 101.64 | 200 | air | 340 | 540 |
| 53 | B | BTBN-4 (g) | 0.255 | BDNI | 0.0155 | 1:1 | 102.33 | 300 | air | 460 | 620 |
| 54 | B | BTBN-4 (g) | 0.255 | BDNI | 0.062 | 1:4 | 98.52 | 200 | air | 450 | 595 |
| 55 | A | BTAA-3 (d) | 0.443 | BDNO | 0.080 | 1:1 | 96 | 200 | nitrogen | 220 | 350 |
|  |  |  |  |  |  |  |  | 300 | nitrogen | 340 | 400 |
| 56 | A | BTAA-3 (d) | 0.443 | BDNI | 0.105 | 1:1 | 105 | 240 | nitrogen | 260 | 300 |
|  |  |  |  |  |  |  |  | 300 | nitrogen | 330 | 370 |

*Bracketed values are not sharply defined.

What is claimed is:

1. A polyimide-polyamic acid product having the repeating structural unit:

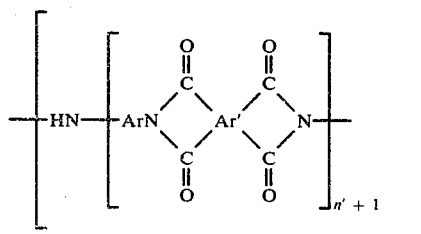

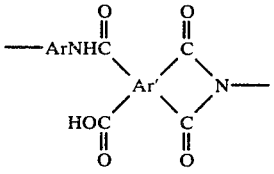

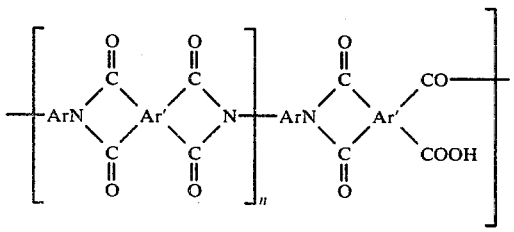

wherein
Ar' is a tetravalent aromatic organic radical, the four carbonyl groups being attached directly to separate carbon atoms and each pair of carbonyl groups being attached to adjacent carbon atoms in the Ar' radical.
Ar is a divalent aromatic organic radical,
n' is a positive integer of at least 1, and
n is a positive integer of at least 2.

2. The product of claim 1 wherein Ar' is selected from the group consisting of

[structures shown]

Ar is selected from the group consisting of

[structures shown]

multiples thereof connected to each other by $R^{IV}$, wherein $R^{IV}$ is alkylene of 1 to 3 carbon atoms,

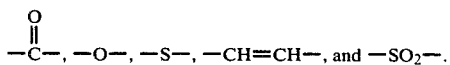

3. The product of claim 2 wherein n is 4–20.
4. The product of claim 3 wherein n' is 4–20.
5. The product of claim 2 in which each of n and n' is 8–10.
6. A process for preparing the product of claim 1 comprising reacting a polyimide of the formula:

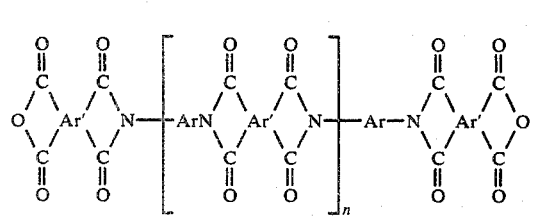

with an aromatic diamine of the formula NH₂ArNH₂ or a diamine terminated imide oligomer of the formula:

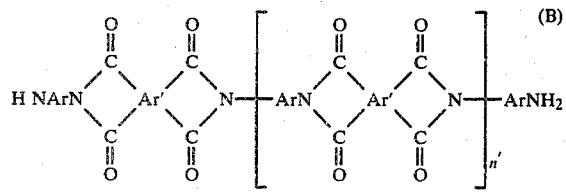

in a solution of a phenol having the formula:

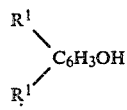

wherein Ar, Ar′, n and n′ in all instances are as defined in claim 1 and R¹ is hydrogen or methyl, the mole ratio of said diamine or said oligomer to said polyimide being 1:1 to 2:1, and thereafter eliminating said phenol to increase the viscosity of the reaction product.

7. A process for preparing the product of claim 1 comprising reacting a polyimide of the formula:

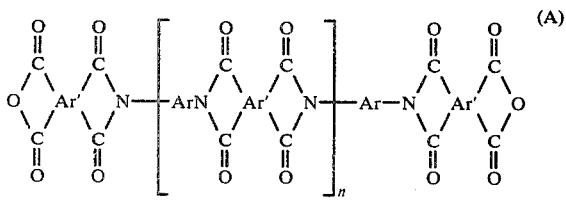

with an aromatic diamine of the formula NH₂ArNH₂ or a diamine terminated imide oligomer of the formula:

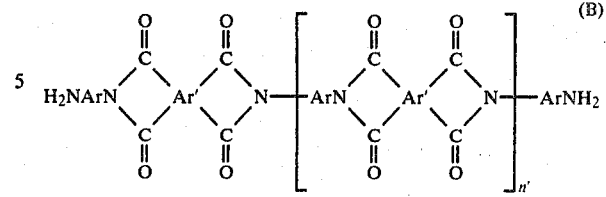

in a solution of phenol having the formula:

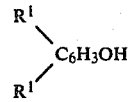

wherein ar, Ar′, n and n′ in all instances are as defined in claim 1 and R¹ is hydrogen or methyl, the mole ratio of said diamine or said oligomer to said polyimide being 1:1 to 2:1.

8. The process of claim 7 wherein each of n and n′ are 4 to 20.

9. The process of claim 6 wherein Ar′ in formula (A), formula (B) or both formulas is

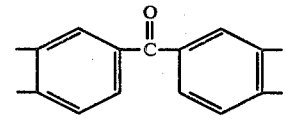

10. The process of claim 8 wherein Ar in formula (A), formula (B) or both formulas is selected from the group consisting of —C₆H₄CH₂C₆H₄—, —C₆H₄SO₂C₆H₄—, —C₆H₄—, —C₆H₄OC₆H₄SO₂C₆H₄OC₆H₄—, —C₆H₄OC₆H₄OC₆H₄— and —C₆H₄OC₆H₄—.

11. The product of claim 1 wherein n+n′ is 8.

12. The product of claim 2 wherein

Ar′ is 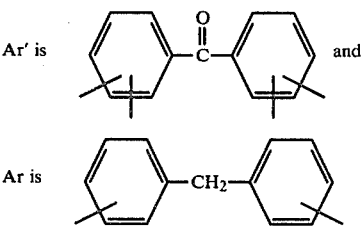 and

Ar is

13. The process of claim 6 wherein said mole ratio is at least 1.1:1.

14. The process of claim 6 wherein said phenol is m-cresol.

15. The process of claim 6 where said phenol is removed from the reaction product by evaporation or distilation.

16. The process of claim 7 wherein said mole ratio is at least 1.1:1.

17. The process of claim 7 wherein said phenol is m-cresol.

* * * * *